(12) United States Patent
Ornes et al.

(10) Patent No.: US 6,993,028 B2
(45) Date of Patent: Jan. 31, 2006

(54) APPARATUS AND METHOD FOR REORDERING SEQUENCE INDICATED INFORMATION UNITS INTO PROPER SEQUENCE

(75) Inventors: Matthew D. Ornes, Madison, WI (US); Gene K. Chui, Campbell, CA (US); Chris Norrie, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 861 days.

(21) Appl. No.: 09/905,394

(22) Filed: Jul. 13, 2001

(65) Prior Publication Data

US 2003/0012199 A1   Jan. 16, 2003

(51) Int. Cl.
*H04L 12/56* (2006.01)
(52) U.S. Cl. ............. 370/394; 370/230; 370/429; 710/52
(58) Field of Classification Search ........... 370/394, 370/428, 395.71, 230, 429; 710/52, 305; 714/35, 702; 708/209; 709/231; 711/109, 711/110
See application file for complete search history.

(56) References Cited

U.S. PATENT DOCUMENTS

| | | | | |
|---|---|---|---|---|
| 5,339,311 A | * | 8/1994 | Turner | 370/394 |
| 5,477,543 A | * | 12/1995 | Purcell | 370/537 |
| 6,421,796 B1 | * | 7/2002 | Gatherer | 714/702 |
| 6,625,176 B1 | * | 9/2003 | Amann et al. | 370/503 |
| 6,781,998 B1 | * | 8/2004 | Karlsson | 370/395.71 |

* cited by examiner

*Primary Examiner*—John Pezzlo
(74) *Attorney, Agent, or Firm*—Victor H. Okumoto

(57) ABSTRACT

An apparatus and method for reordering sequence indicated information units into proper sequence are described. The apparatus includes a double-back shifter receiving sequence indicated information units, and at least one circuit coupled to the double-back shifter to repetitively compare, reorder and shift the sequence indicated information units so as to be in proper sequence when shifted out of the double-back shifter. The method includes repetitively comparing, reordering and shifting sequence indicated information units in a double-back shifter so as to be in proper sequence when shifted out of the double-back shifter.

40 Claims, 16 Drawing Sheets

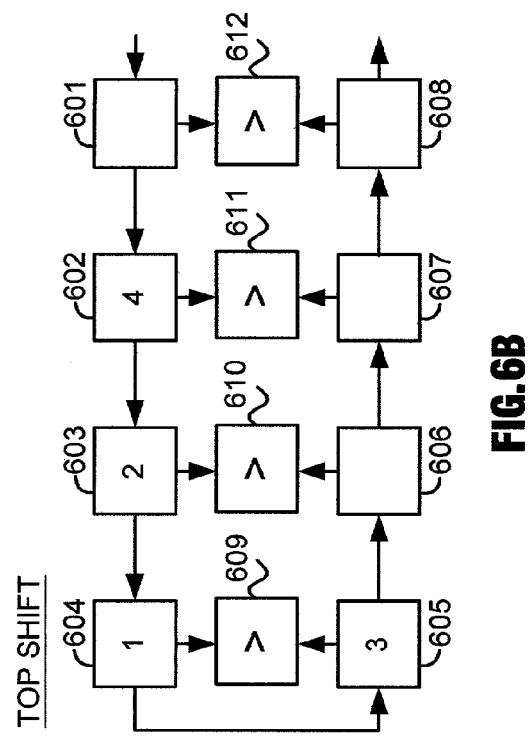
FIG.6B
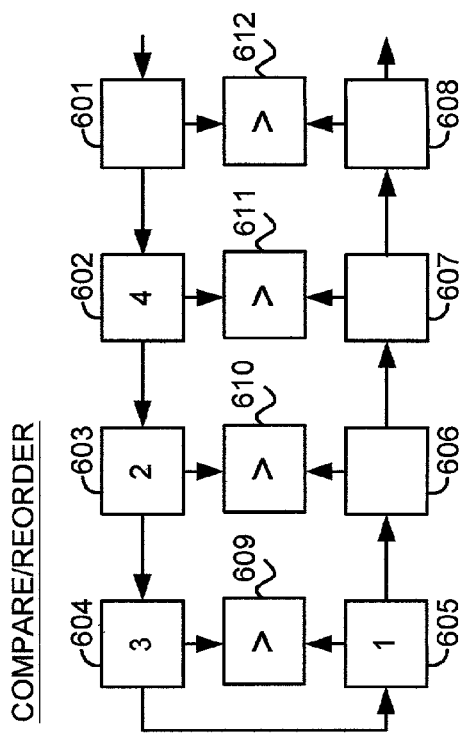
FIG.6C
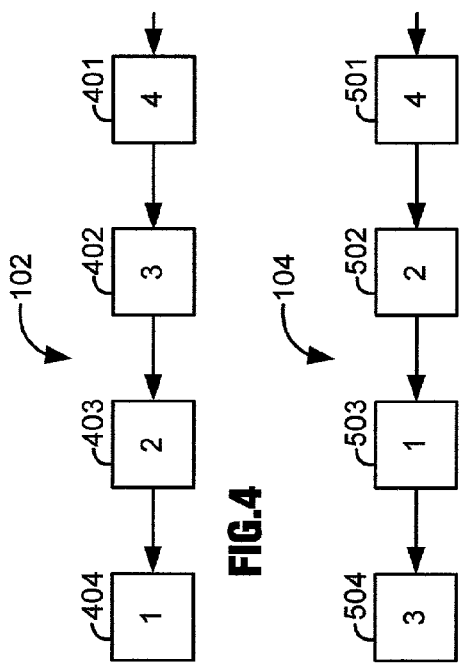
FIG.4
FIG.5
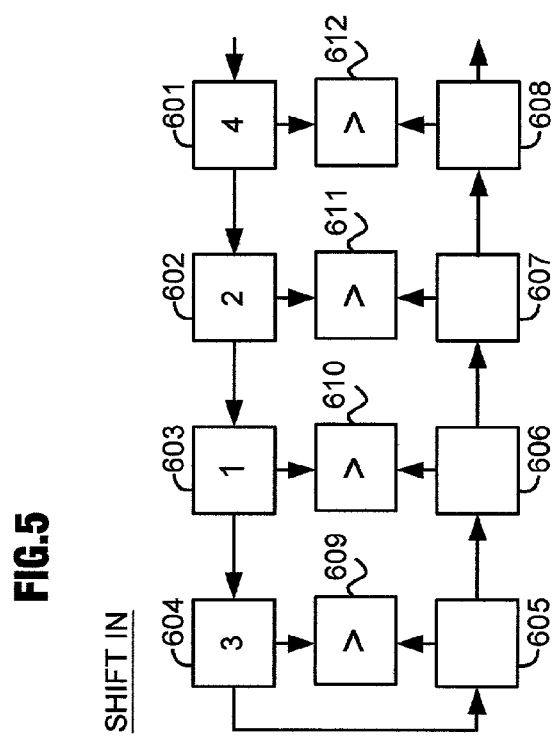
FIG.6A

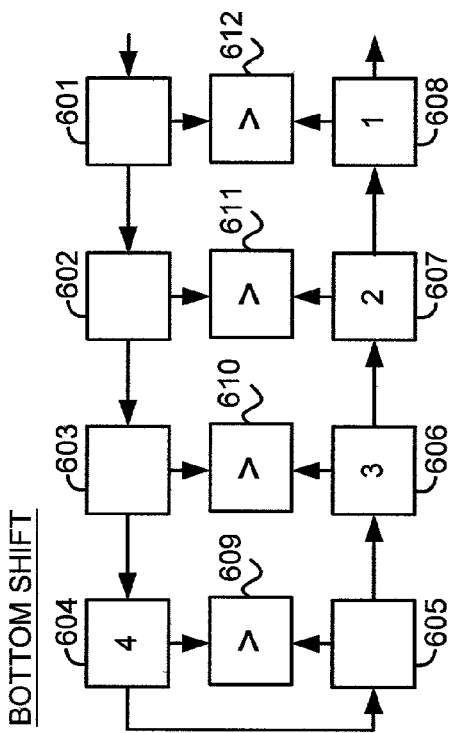
FIG.6L BOTTOM SHIFT
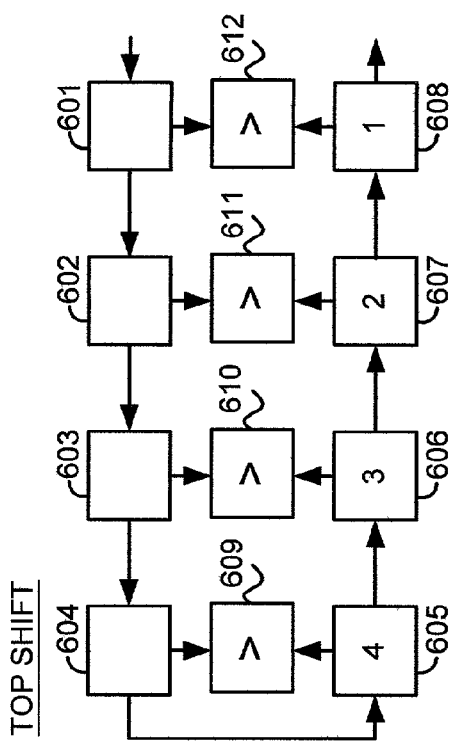
FIG.6N TOP SHIFT
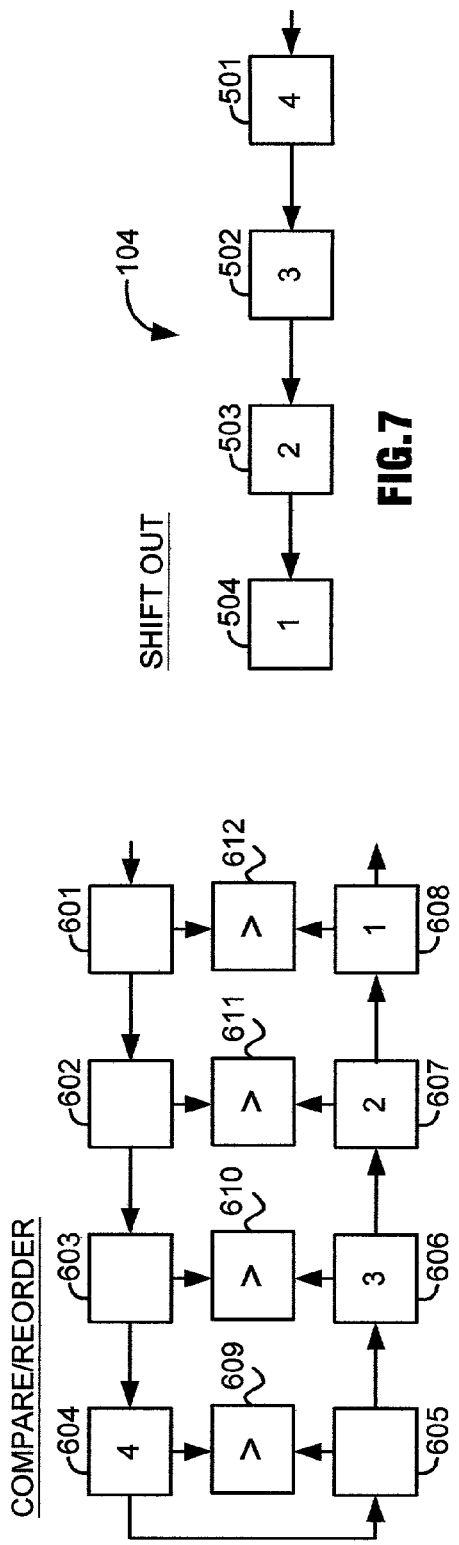
FIG.6M COMPARE/REORDER
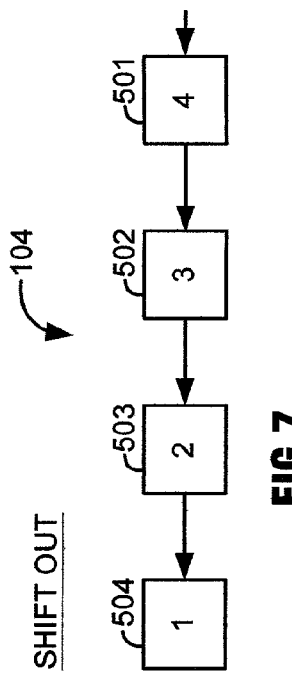
FIG.7 SHIFT OUT

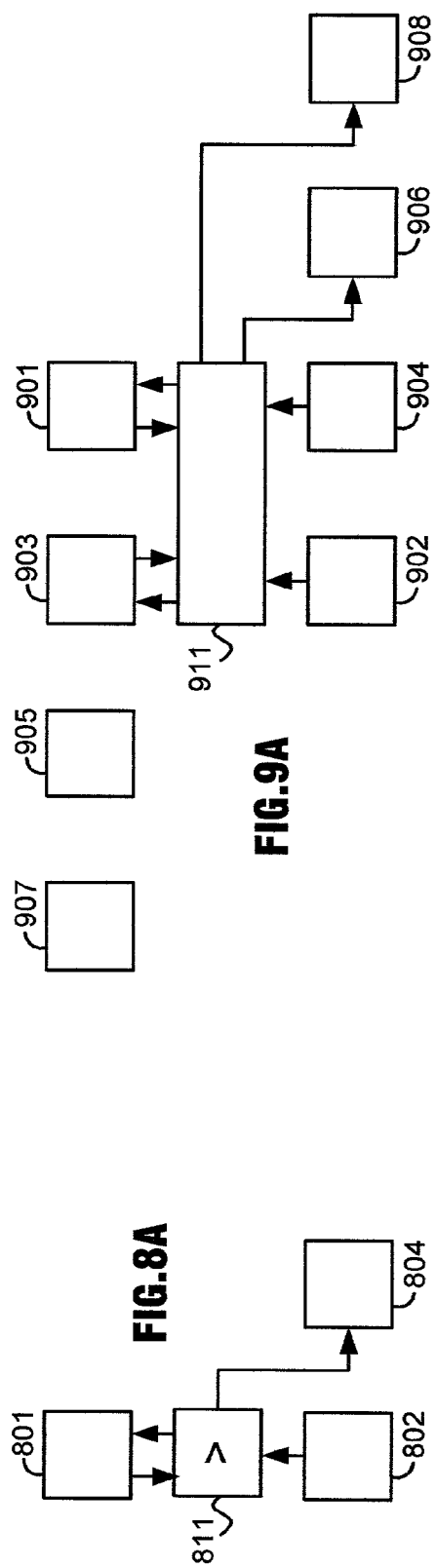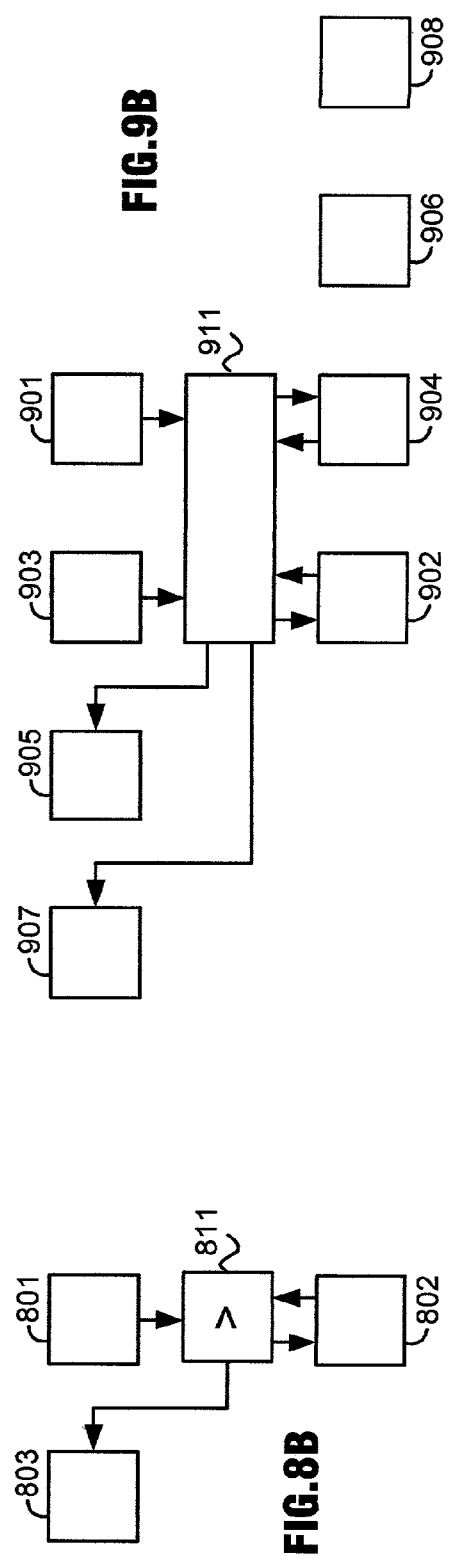

APPARATUS AND METHOD FOR REORDERING SEQUENCE INDICATED INFORMATION UNITS INTO PROPER SEQUENCE

FIELD OF THE INVENTION

The present invention generally relates to techniques for sorting sequential information into proper sequence and in particular, to an apparatus and method for reordering sequence indicated information units into proper sequence.

BACKGROUND OF THE INVENTION

Certain applications require received information units to be sorted into proper sequence. For example, where the information units had been transmitted in proper sequence, but received out of sequence, then it is commonly necessary to resort or reorder the information units back into their proper sequence. Although there are numerous sorting algorithms commonly available for sorting sequence indicated information units in the software domain, in certain applications, an efficient and simple to implement hardware solution is desirable to meet system performance requirements.

OBJECTS AND SUMMARY OF THE INVENTION

Accordingly, it is an object of the present invention to provide an easily implemented apparatus for reordering sequence indicated information units into proper sequence.

Another object is to provide a high performance apparatus for reordering sequence indicated information units into proper sequence.

Another object is to provide a reliable apparatus for reordering sequence indicated information units into proper sequence.

Another object is to provide a method for reordering sequence indicated information units into proper sequence that results in high performance operation when implemented in hardware.

These and additional objects are accomplished by the various aspects of the present invention, wherein briefly stated, one aspect of the invention is an apparatus for reordering sequence indicated information units into proper sequence. The apparatus includes a double-back shifter receiving sequence indicated information units, and at least one circuit coupled to the double-back shifter to repetitively compare, reorder and shift the sequence indicated information units so as to be in proper sequence when shifted out of the double-back shifter. In a preferred embodiment, the double-back shifter includes two rows of storage units configured such that an output of one row is shifted into the other row as input and the two rows shift their stored contents in opposite directions.

In another aspect, a method for reordering sequence indicated information units into proper sequence, comprises: repetitively comparing, reordering and shifting sequence indicated information units in a double-back shifter so as to be in proper sequence when shifted out of the double-back shifter. The sequence indicated information units being compared and the associated sequence indicated information units that are being reordered in light of such comparison depend upon the mode of operation of the method. The mode of operation is preferably determined by: whether a double shift or single shift method is employed; the number of columns shifted during each shift; whether the comparing, reordering and shifting are performed in a single operation; and whether the incoming sequence indicated information units are a limited or continuous stream of information units.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 4 illustrates, as an example, sequence indicators included with information units stored in a 4-cell outgoing buffer.

FIG. 5 illustrates, as an example, sequence indicators included with information units stored in a 4-cell incoming buffer.

FIG. 7 illustrates, as an example, sequence indicators included with information units being shifted out of the cell reorder apparatus utilizing aspects of the present invention.

FIGS. 8A~8B illustrate, as an example, a single column, double shift mode of operation utilizing aspects of the present invention.

FIGS. 9A~9B illustrate, as an example, a double column, double shift mode of operation utilizing aspects of the present invention.

DETAILED DESCRIPTION OF THE PREFERRED EMBODIMENT

Figure 1:
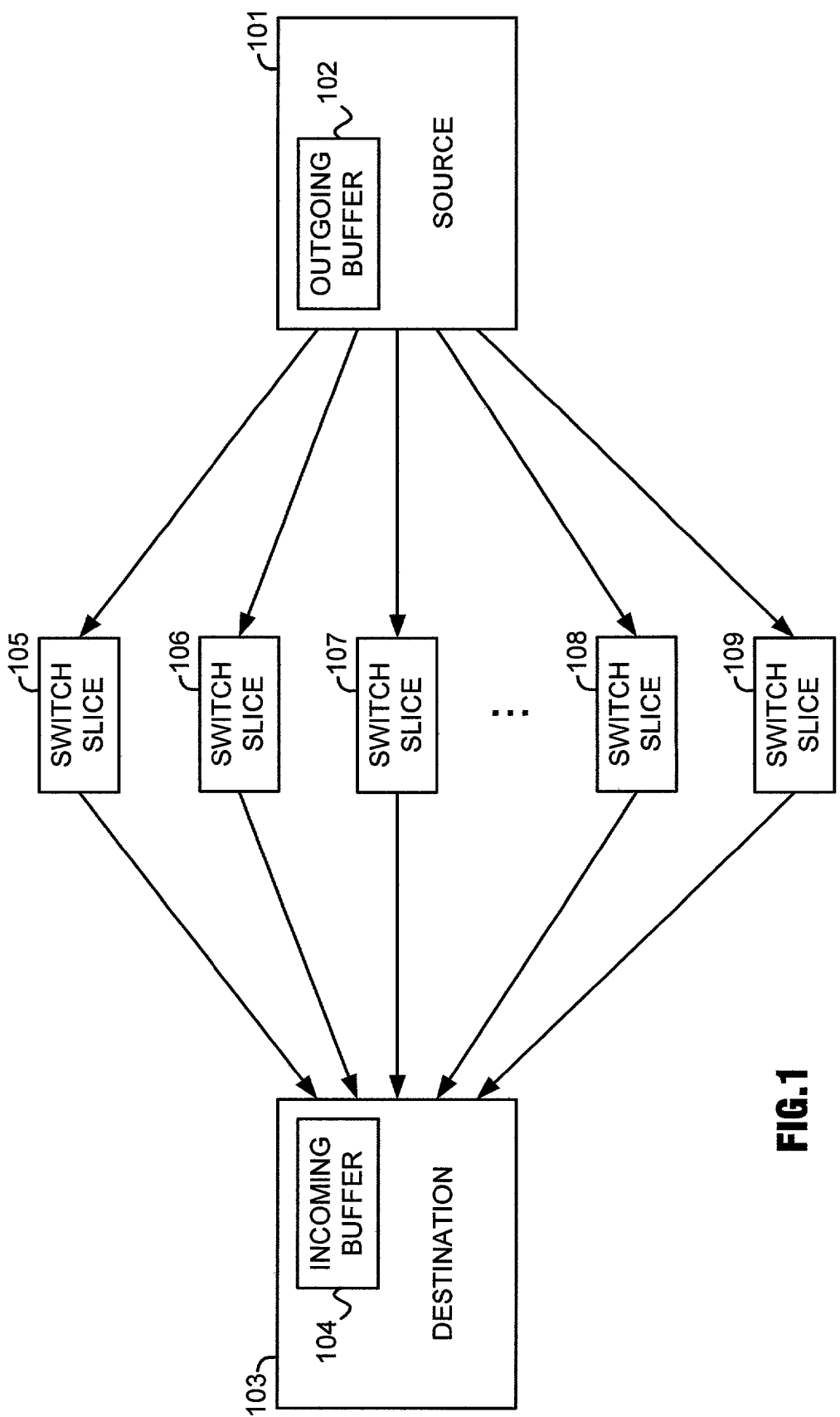
FIG. 1 illustrates, as an example, a block diagram of portions of a SONET network element.

One important example of an application employing the present invention is in a synchronous optical network ("SONET") or synchronous digital hierarchy ("SDH") network element such as the SONET or SDH network element partially depicted in FIG. 1. In this application, information units in the form of cells or payloads are stored in an outgoing buffer 102 of a source 101 for transmission to an incoming buffer 104 of a destination 103 through a distributed switch fabric including representative switch slices 105~109.

Although it is advantageous for the switch slices to operate asynchronously, such asynchronous operation increases the likelihood that the cells will arrive out of sequence at the incoming buffer 104. For example, different delays in transit from the outgoing buffer 102 to the incoming buffer 104 may result from clock differences between switch slices in the distributed switch fabric, as different cells take different routes through the distributed switch fabric. For example, one cell might be transmitted through switch slice 105 having a certain clock frequency while another cell might be transmitted through switch slice 106 having a slightly higher or lower clock frequency than that of switch slice 105. If the switch fabric is included in a multi-shelf system, then additional differences in transit delays may also result from different switch slices being located on different shelves in the system.

To avoid such problems with asynchronous systems, a synchronous or common clock system may be employed in the SONET NE. Such synchronous systems, however, are generally much more complicated to implement and therefore, much more expensive to manufacture than a corresponding asynchronous system. Synchronous systems are particularly more difficult to implement in a multi-shelf system. They are also prone to be less reliable than corresponding asynchronous systems, because of their added complexity.

Accordingly, the present invention is particularly useful in facilitating a multi-shelf distributed switch fabric including asynchronously operating switch slices in a SONET or SDH network element. It is therefore noted that the following description and claimed aspects of the present invention are applicable to synchronous optical networks (SONET), synchronous digital hierarchy (SDH) networks, as well as other applications. As for SONET and SDH networks, the term SONET, as used herein, shall be understood to include both SONET and SDH to simplify the following description and claims.

Figure 2:
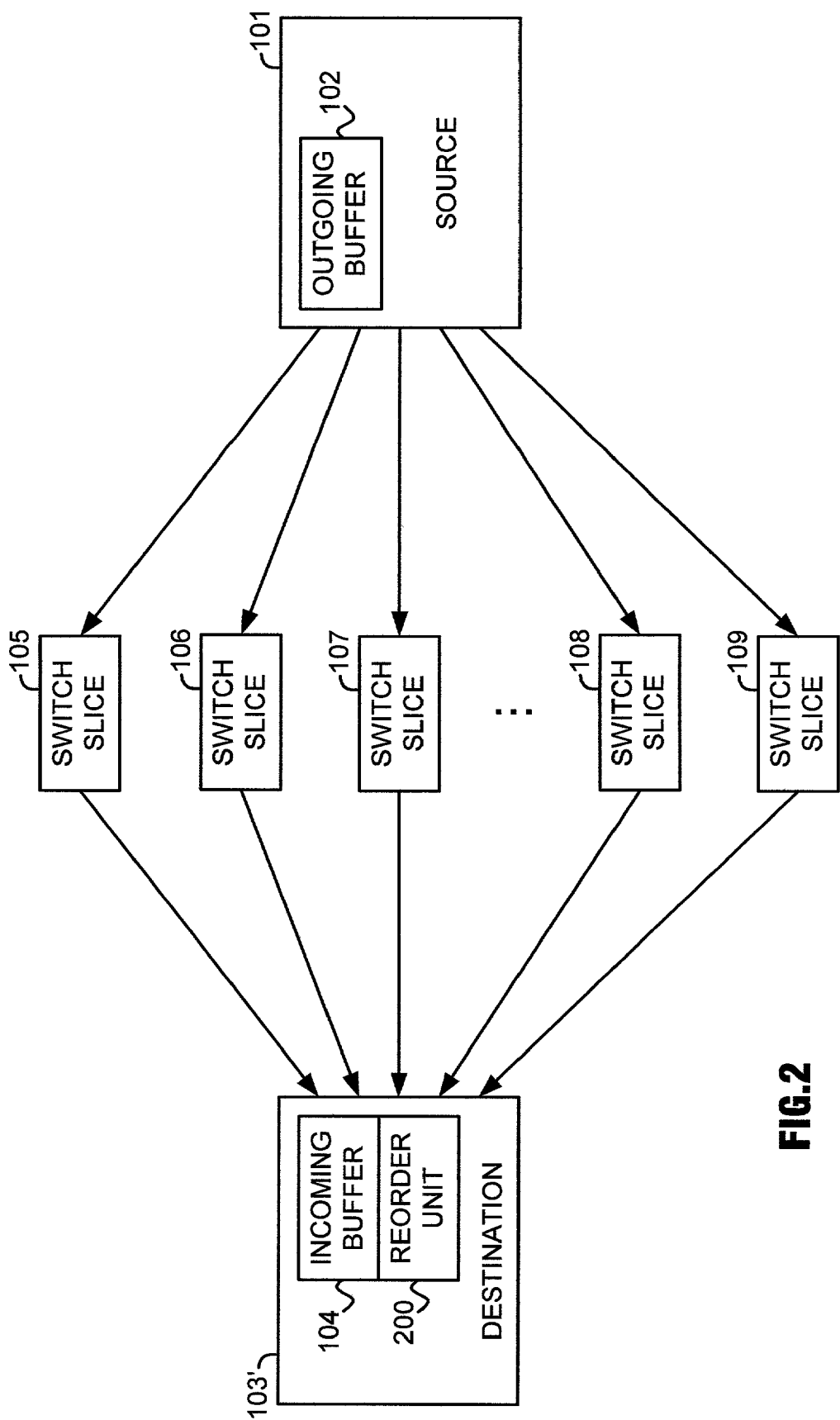
FIG. 2 illustrates, as an example, a block diagram of portions of a SONET network element including an apparatus utilizing aspects of the present invention.

FIG. 2 illustrates, as an example, a block diagram of portions of a SONET network element including an apparatus identified as cell reorder unit 200. The cell reorder unit 200 reorders the received information units stored in incoming buffer 104 into proper sequence according to sequence information included in the received information units. The reordered information units may then be sent directly to other circuitry in the destination 103 for continued processing.

Figure 3:
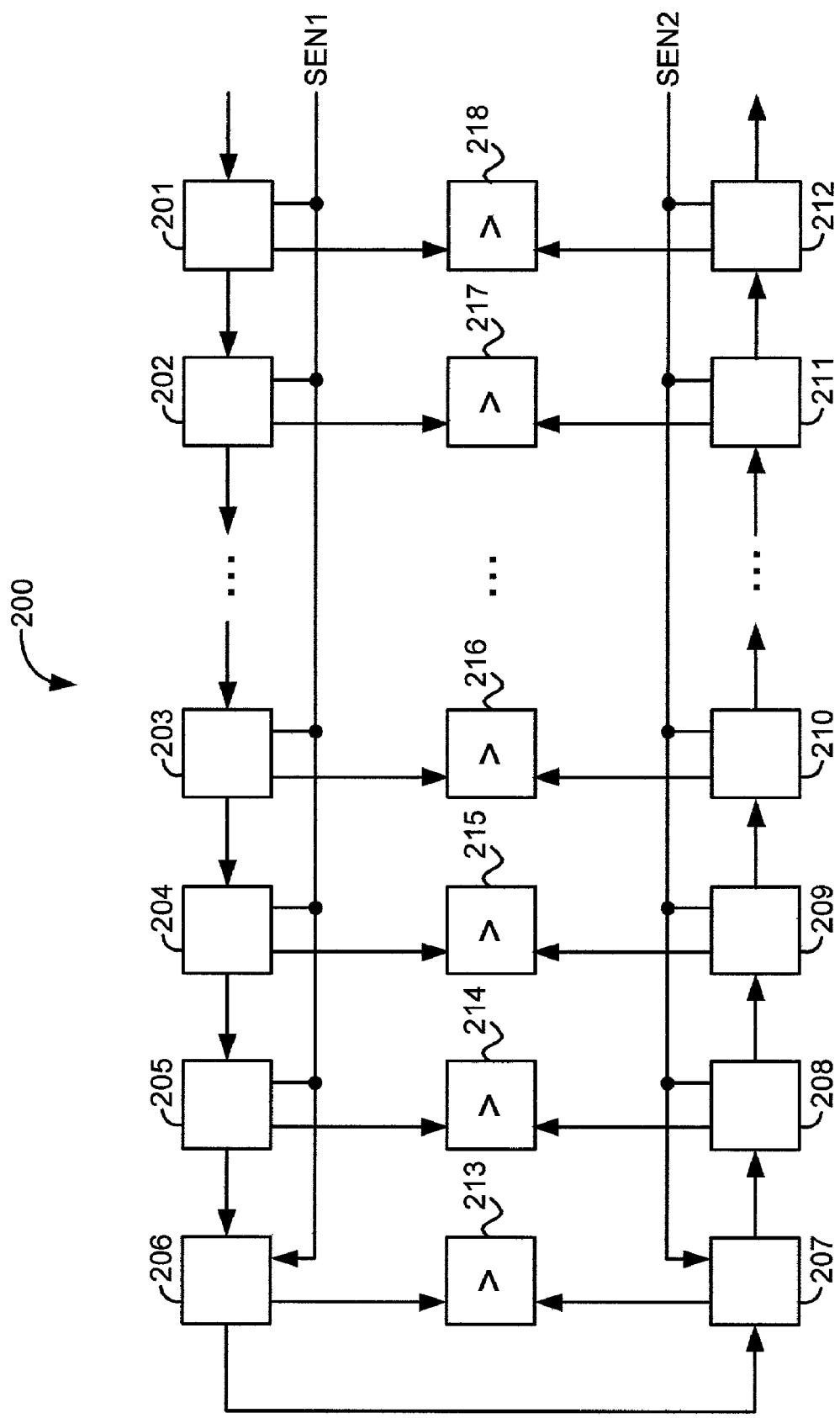
FIG. 3 illustrates, as an example, a block diagram of a cell reorder apparatus for reordering sequence indicated information units into proper sequence, utilizing aspects of the present invention.

FIG. 3 illustrates, as an example, a block diagram of one version of a cell reorder unit or apparatus 200 for reordering sequence indicated information units into proper sequence, employing a single column, double shift mode of operation. A first plurality of serially coupled storage units (including representative storage units 201~206) function as a first shifter responsive to an upper row enable signal SEN1, and a second plurality of serially coupled storage units (including representative storage units 207~212) function as a second shifter responsive to a lower row enable signal SEN2. Each of the storage units (e.g., 201~212) is capable of storing an information unit such as, in this case, a sequence indicator, a source indicator, a payload location pointer, and a valid entry indicator for a SONET payload or cell.

A last storage unit 206 of the first plurality of serially coupled storage units is coupled to a first storage unit 207 of the second plurality of serially coupled storage units so that an information unit shifted out of the storage unit 206 is shifted into the storage unit 207. Coupled together in this fashion, the first and second pluralities of serially coupled storage units function and are referred to herein as a double-back shifter. For convenience in the following description and claims, the first plurality of serially coupled storage units (including representative storage units 201~206) is referred to herein as a first shifter or a top or upper row of the double-back shifter, and the second plurality of serially coupled storage units (including representative storage units 207~212) is referred to as a second shifter or a bottom or lower row of the double-back shifter. A key feature of the double-back shifter is that the top row shifts in one direction (e.g., from right to left in this example), and the bottom row shifts in an opposite direction (e.g., from left to right in this example). The operation mode in this example is referred to as being a double shift, because the top and bottom rows of the double-back shifter are shifted independently and at different times.

Compare and reorder logic, comprising, in this example, a plurality of compare and reorder elements or circuits (including representative elements 213~218), is also included in this version of the cell reorder unit 200. Each compare and reorder element is coupled to a corresponding pair of storage units from the first and second pluralities of serially coupled storage units. The corresponding pairs are generated by pairing storage units in a shifting order (e.g., 201~206) of the first plurality of serially coupled storage units with storage units in a reverse shifting order (e.g., 212~207) of the second plurality of serially coupled storage units. For example, in the double-back shifter configuration depicted in FIG. 3, the corresponding pairs are formed by corresponding positions of the first and second rows (i.e., storage cells in a same column of the two rows).

Each of the plurality of compare and reorder elements functions to read and compare sequence information included in information units stored in its corresponding pair, and reorder the information units into their proper sequence if the comparison indicates that the information units are out of sequence, are valid information units, and are from the same source.

The plurality of compare and reorder elements perform their function following each shift of the top and bottom row of the double-back shifter. After stored information units are alternately shifted in the top and bottom rows, and processed following each shift by the plurality of compare and reorder elements, the information units are eventually found reordered into proper sequence by the time they are completely shifted out of the second row of the double-back shifter.

To illustrate the operation of the reorder cell unit 200 in a single column, double shift mode of operation for a limited stream of incoming information units, FIGS. 4~7 are now described. FIG. 4 illustrates, for this simplified example, sequence indicators that are included in information units stored in a 4-cell outgoing buffer 102 of the source 101. As previously described, these information units are then transmitted to an incoming buffer 104 of the destination 103 through the distributed switch fabric including representative switch slices 105~109. FIG. 5 illustrates sequence indicators included in the received information units as stored in a 4-cell incoming buffer 104 of the destination 103. Note that the information unit stored in storage unit 504 has arrived out of sequence in this example, having arrived before information units stored in storage units 502 and 503 rather than after those units as it was supposed to.

FIGS. 6A~6N illustrate, as examples, the sequence indicators of the information units and their locations in various stages of their processing by the FIG. 3 version of the cell reorder unit 200. In FIG. 6A, the information units stored in the incoming buffer 104 are shown shifted into the top row of the double-back shifter from the incoming buffer 104. The top row comprising serially coupled storage cells 601~604, in this example, also has a length of 4-cells for convenience in this description, although generally it would be longer to account for skew and other considerations in the system. In FIG. 6B, contents of the first row are shown as each being shifted one storage unit to the left, except the contents of the last storage unit 604, which is shown being shifted into the first storage unit 605 of the second row. In FIG. 6C, contents of the first and second rows are shown after the compare and reorder element 609 has performed its function. In particular, the compare and reorder element 609 has read the sequence information in its corresponding pair of storage units, 604 and 605, and determined that they are out of sequence since the sequence indicator 1 in this case should be before the sequence indicator 3. As a result, the compare and reorder element 609 has reordered or swapped the contents of storage units 604 and 605 in this case so that they are placed in the proper sequence. Compare and reorder elements 610, 611 and 612 have not performed any reordering since storage units 606, 607, 601 and 608, in this example, are presumed to contain invalid information units, and the compare and reorder elements 609~612 only process valid information units from the same source.

Figure 6F:
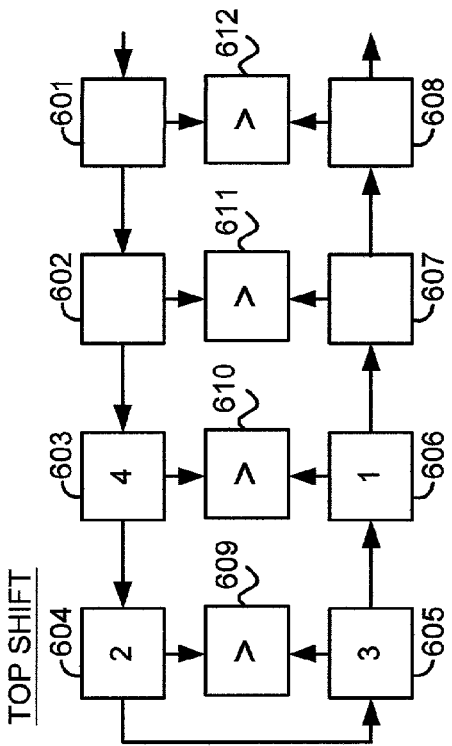
FIGS. 6A~6N illustrate a simplified example of a single column, double shift mode of operation on a limited stream of incoming information units, utilizing aspects of the present invention.
Figure 6G:
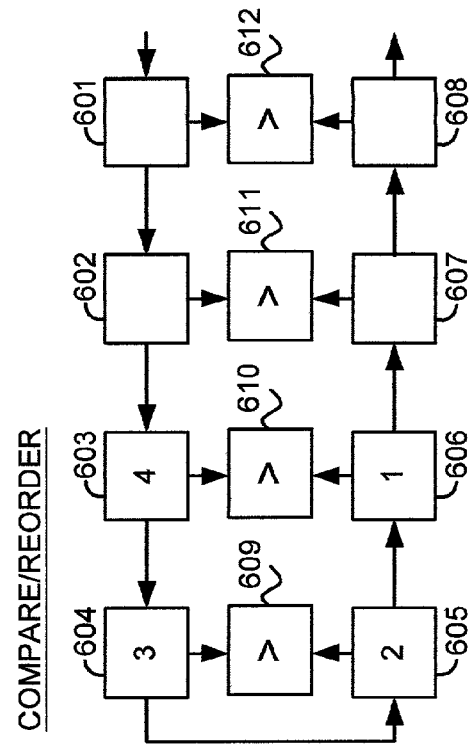
Figure 6D:
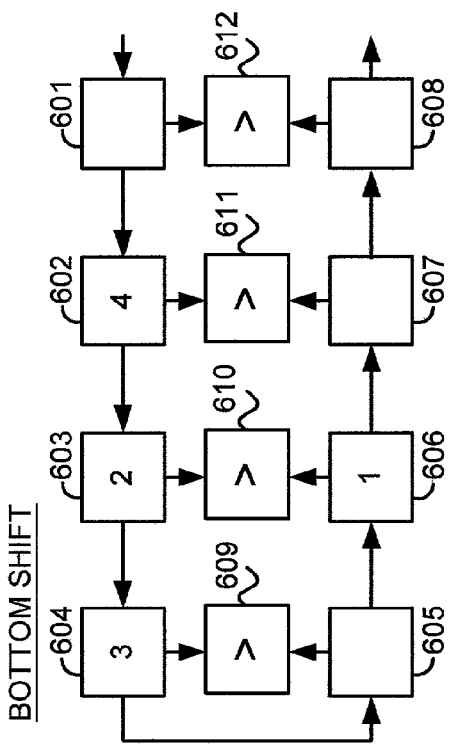
Figure 6E:
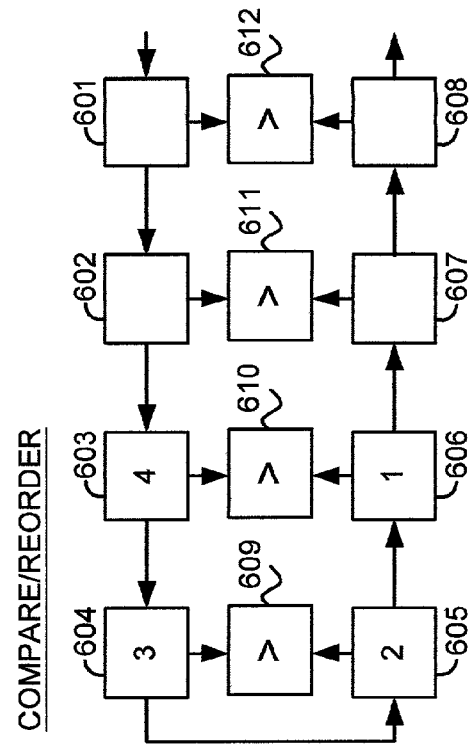

In FIG. 6D, contents of the second row are shown being shifted one storage unit to the right. In FIG. 6E, contents of the first and second rows are shown after the compare and reorder element 610 has performed its function. In particular, the compare and reorder element 610 has read the sequence information in its corresponding pair of storage units, 603 and 606, and determined that they are in sequence since the sequence indicator 1 in this case is and should be before the sequence indicator 2. As a result, the compare and reorder element 610 has left the contents of storage units 603 and 606 alone since they are already in the proper sequence. Meanwhile, compare and reorder elements 609, 611 and 612 have not performed any reordering since storage units 605, 607, 601 and 608, in this example, are presumed to contain invalid information units.

In FIG. 6F, contents of the first row are shown as each being shifted one storage unit to the left again, except the contents of the last storage unit 604, which is shown being shifted into the first storage unit 605 of the second row. In FIG. 6G, contents of the first and second rows are shown after the compare and reorder elements 609 and 610 have performed their functions. In particular, the compare and reorder element 609 has read the sequence information in its corresponding pair of storage units, 604 and 605, and determined that they are out of sequence since the sequence indicator 2 in this case should be before the sequence indicator 3. As a result, the compare and reorder element 609 has reordered or swapped the contents of storage units 604 and 605 in this case to be in the proper sequence, so that the information unit having the sequence indicator 3 is now in storage unit 604 and the information unit having the sequence indicator 2 is now in storage unit 605. Meanwhile, the compare and reorder element 610 has read the sequence information in its corresponding pair of storage units, 603 and 606, and determined that they are in sequence since the sequence indicator 1 in this case is and should be before the sequence indicator 4. As a result, the compare and reorder element 610 has left the contents of storage units 603 and 610 alone since they are already in the proper sequence. Meanwhile, compare and reorder elements 611 and 612 have not performed any reordering since storage units 601, 602, 607 and 608, in this example, are presumed to contain invalid information units.

Figure 6J:
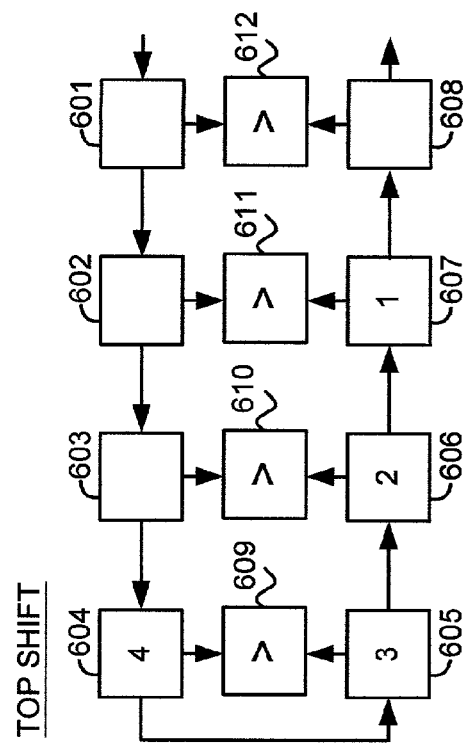
Figure 6K:
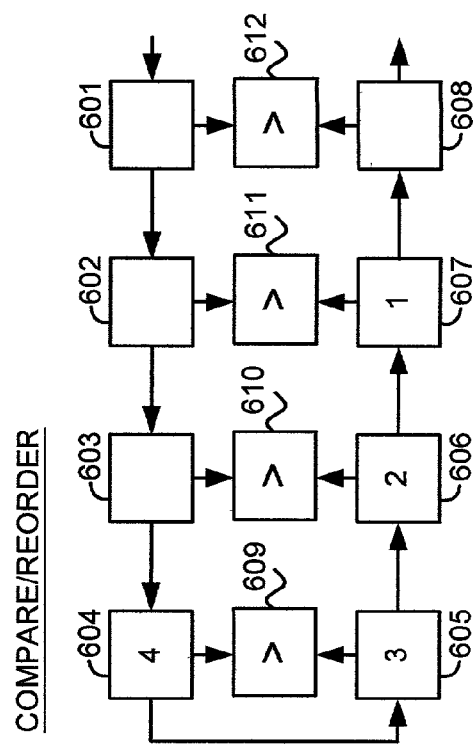
Figure 6H:
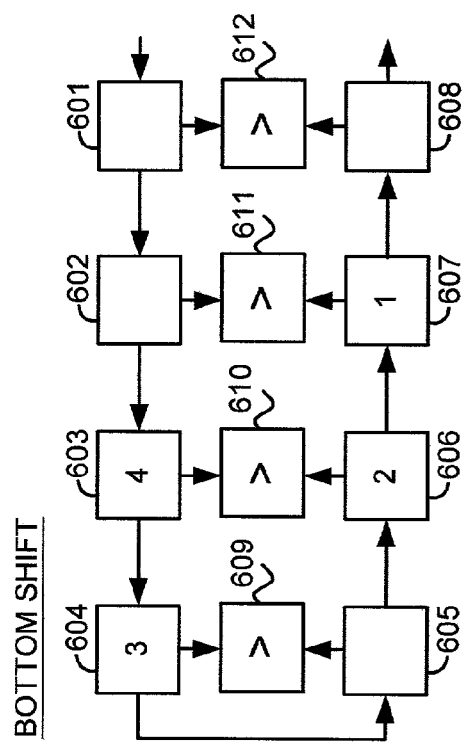
Figure 6I:
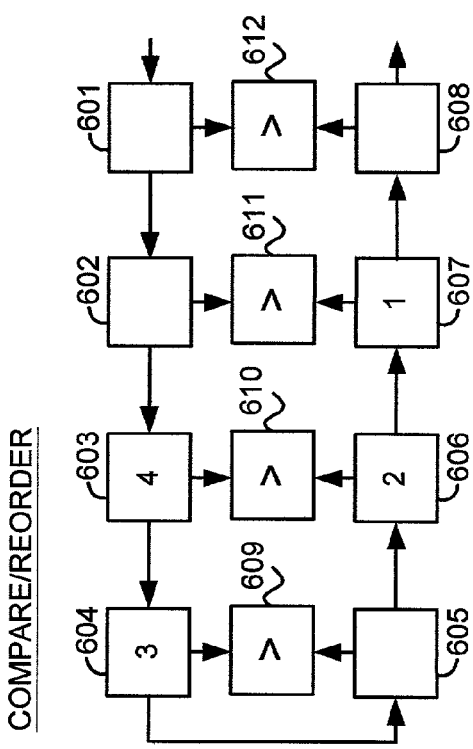

In FIG. 6H, contents of the second row are shown being shifted one storage unit to the right. In FIG. 6I, contents of the first and second rows are shown after the compare and reorder element 610 has performed its function. In particular, the compare and reorder element 610 has read the sequence information in its corresponding pair of storage units, 603 and 606, and determined that they are in sequence since the sequence indicator 2 in this case is and should be before the sequence indicator 4. As a result, the compare and reorder element 610 has left the contents of storage units 603 and 606 alone since they are already in the proper sequence. Meanwhile, compare and reorder elements 609, 611 and 612 have not performed any reordering since storage units 605, 602, 601 and 608, in this example, are presumed to contain invalid information units.

In FIG. 6J, contents of the first row are shown as each being shifted one storage unit to the left, except the contents of the last storage unit 604, which is shown being shifted into the first storage unit 605 of the second row. In FIG. 6K, contents of the first and second rows are shown after the compare and reorder element 609 has performed its function. In particular, the compare and reorder element 609 has read the sequence information in its corresponding pair of storage units, 604 and 605, and determined that they are in sequence since the sequence indicator 3 in this case is and should be before the sequence indicator 4. As a result, the compare and reorder element 609 has left the contents of storage units 604 and 605 alone in this case since they are already in the proper sequence. Meanwhile, compare and reorder elements 610, 611 and 612 have not performed any reordering since storage units 603, 602, 601 and 608, in this example, are presumed to contain invalid information units.

In FIG. 6L, contents of the second row are shown being shifted one storage unit to the right again. In FIG. 6M, contents of the first and second rows are shown unchanged this time after the compare and reorder elements 609~612 have performed their functions. In this case, no reordering has been performed by any of the compare and reorder elements, because storage units 605, 603, 602 and 601, in this example, are presumed to contain invalid information units. In FIG. 6N, contents of the first and second rows are shown after the information unit stored in the last storage unit 604 in the first row has been shifted into the first storage unit 605 of the second row. The information units contained in storage units 605~608 of the second row are now in proper sequence. FIG. 7 then illustrates the sequence indicators being in proper sequence for the information units that have been shifted out of the second row of the double-back shifter.

Although the example described above in reference to FIGS. 4~7 referred to "swapping contents" of storage units, it is to be appreciated that reordering of information units may be performed by various well-known techniques including swapping contents, swapping pointers, and effectively coupling and decoupling of storage units from one row to another by using, for example, multiplexer circuits controlled by the compare and reorder logic. Also, although the example described above performs a shift before a compare and reorder, these two operations may be reversed and/or performed in a same operation. Further, although the example described a double shift mode of operation wherein the top row was shifted prior to shifting the bottom row, the order of shifting may be reversed.

FIGS. 8A~8B illustrate, for example, a single column, double shift mode of operation, wherein the compare and reorder step and the shift step have been combined into a single macro step. In FIG. 8A, a compare and reorder element, circuit or logic 811 compares sequence indicators stored in corresponding storage units 801 and 802, then stores the information unit with the higher (later sequenced) one in storage unit 801 and shifts the information unit with the lower (earlier sequenced) one into associated storage unit 804, which is one column to the right of storage unit 802 on the bottom row. (Note, however, that if the storage unit 802 is the last storage unit in the bottom row of the double-back shifter, then the information unit with the lower sequence indicator is instead shifted out of the double-back shifter.) Meanwhile, another compare and reorder element to the left of the compare and reorder element 811 (or an extension of the compare and reorder element 811) is performing a similar function to update the contents of storage unit 802.

In FIG. 8B, the compare and reorder element 811 compares sequence indicators stored in corresponding storage units 801 and 802, then stores the information unit with the lower one in storage unit 802 and shifts the information unit with the higher one into associated storage unit 803, which is one column to the left of storage unit 801 on the top row. (Note, however, that if the storage unit 801 is the last storage unit in the top row of the double-back shifter, then the information unit with the higher sequence indicator is instead shifted into the storage unit 802, which, in that case would be the first storage unit in the bottom row.) Meanwhile, another compare and reorder element to the right of the compare and reorder element 811 (or an extension of the compare and reorder element 811) is performing a similar function to update the contents of storage unit 801.

Although the prior examples described single column shifts, multiple column shifts may also be performed in the present invention. FIGS. 9A~9B illustrate, as an example, a double column, double shift mode of operation, wherein the compare and reorder step and the shift step have been combined into a single macro step. In FIG. 9A, a compare and reorder element, circuit or logic 911 compares sequence indicators stored in corresponding storage units 901, 902, 903 and 904, then stores a highest one in storage unit 901, stores a second highest one in storage unit 903, shifts a lowest one into associated storage unit 908, and shifts a second lowest one into associated storage unit 906. Associated storage units 906 and 908 are respectively two and one columns to the right of storage unit 904 on the bottom row, and therefore, by updating their contents at the same time, a double column shift is performed. (Note, however, that if the storage units 902 and 904 are the last storage units in the bottom row of the double-back shifter, then the information units with the lower and second lowest sequence indicators are instead shifted out of the double-back shifter.) Meanwhile, another compare and reorder element to the left of the compare and reorder element 911 (or an extension of the compare and reorder element 911) is performing a similar function to update the contents of storage units 902 and 904.

In FIG. 9B, the compare and reorder element 911 compares sequence indicators stored in corresponding storage units 901, 902, 903 and 904, then stores a lowest one in storage unit 904 and a second lowest one in storage unit 902, and shifts a highest one into associated storage unit 905 and a second highest one into associated storage unit 907, which are respectively two and one columns to the left of storage unit 903 on the top row. (Note, however, that if the storage units 901 and 903 are the last storage units in the top row of the double-back shifter, then the information unit with the highest sequence indicator is instead shifted into the storage unit 902 and the information unit with the second highest sequence indicator is shifted into the storage unit 904, which would be the second and first storage units in the bottom row.) Meanwhile, another compare and reorder element to the right of the compare and reorder element 911 (or an extension of compare and reorder element 911) is performing a similar function to update the contents of storage units 901 and 903.

Figure 10A:
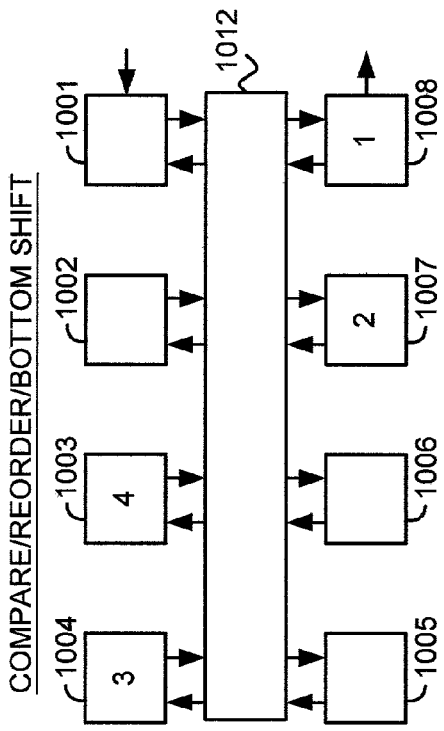
FIGS. 10A~10D illustrate a simplified example of the double column, double shift mode of operation on a limited stream of incoming information units, utilizing aspects of the present invention.
Figure 10C:
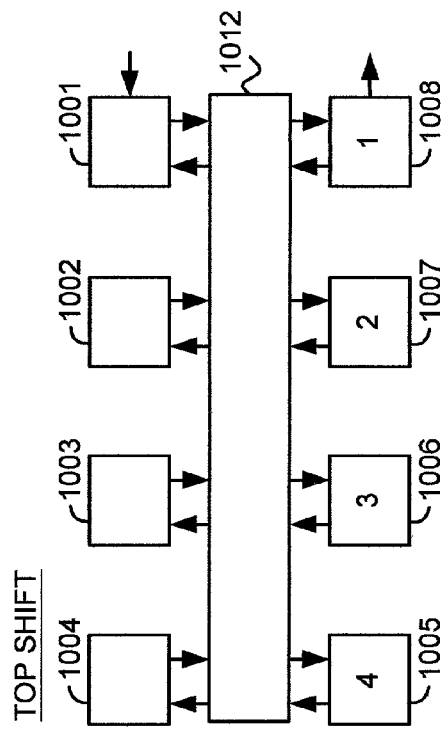
Figure 10B:
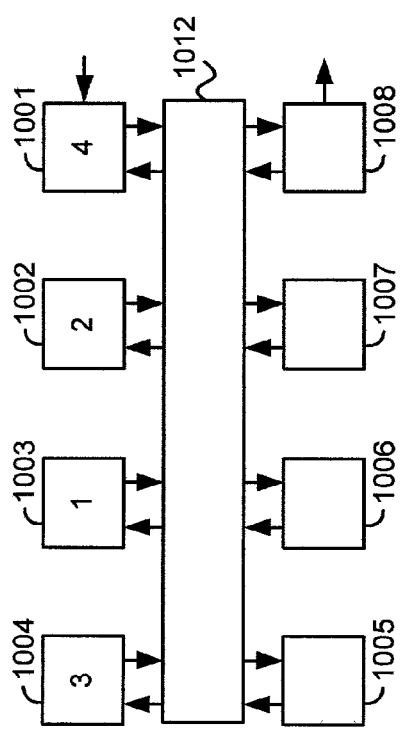
Figure 10D:
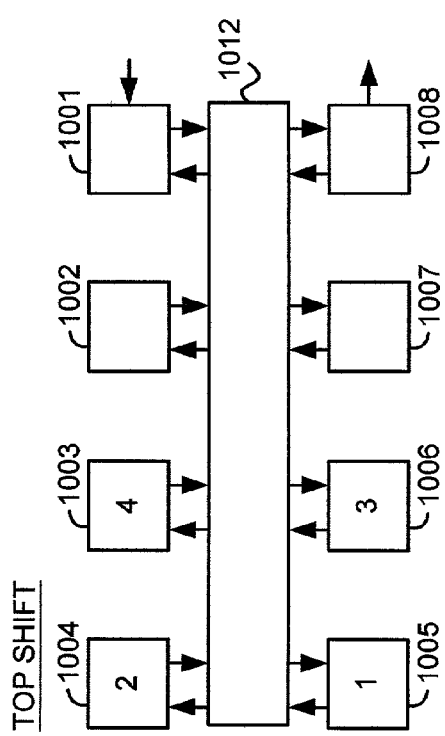

FIGS. 10A~10D illustrate, as a simplified example, the operation of a second version of the reorder cell unit 200, employing a double column, double shift mode of operation for a limited stream of incoming information units. In FIG. 10A, the first row of a double-back shifter including storage units 1001~1008 is shown storing sequence indicators that are out of sequence. In FIG. 10B, after execution of a double column shift, the contents of top row storage units 1004 and 1003 have been respectively shifted into bottom row storage units 1006 and 1005. No comparison and reorder operations had been performed in this case, because storage units 1005~1008 are assumed to contain invalid entries. In FIG. 10C, compare and reorder logic 1012 (comprising at least one circuit) compares sequence indicators stored in corresponding storage units 1003~1006, and reorders the contents of those storage units such that the information unit with the highest sequence indicator is stored in storage unit 1003 (in this case, the information unit having the sequence indicator of 4), the information unit with the second highest sequence indicator is stored in storage unit 1004 (in this case, the information unit having the sequence indicator of 3), the information unit with the lowest sequence indicator is shifted into storage unit 1008 (in this case, the information unit having the sequence indicator of 1), and the information unit with the second lowest sequence indicator is shifted into storage unit 1007 (in this case, the information unit having the sequence indicator of 2). In FIG. 10D, after execution of a double column shift, the contents of top row storage units 1004 and 1003 have been respectively shifted into bottom row storage units 1006 and 1005. No comparison and reorder operations had been performed in this case, because storage units 1001~1002 corresponding to storage units 1008~1007 and storage units 1005~1006 corresponding to storage units 1004~1003 are assumed to contain invalid entries. As is evident by inspection of the bottom row of the double-back shifter, contents are now in proper sequence in the bottom row.

By extending the at least one circuit described above in reference to FIGS. 8A~8B and 9A~9B, compare and reorder operations for higher number column shifts are readily determinable. Although the implementation for such higher number column shift versions get increasingly more complex, the added complexity may be justified in situations where execution speed and/or bandwidth are critical.

Although the prior examples described double shift operations with alternating top and bottom or bottom and top row shifts, single shift operations may also be performed in the present invention. In this case, the operation is referred to as being a single shift, because the top and bottom rows of the double-back shifter are shifted together at the same time.

Figure 11:
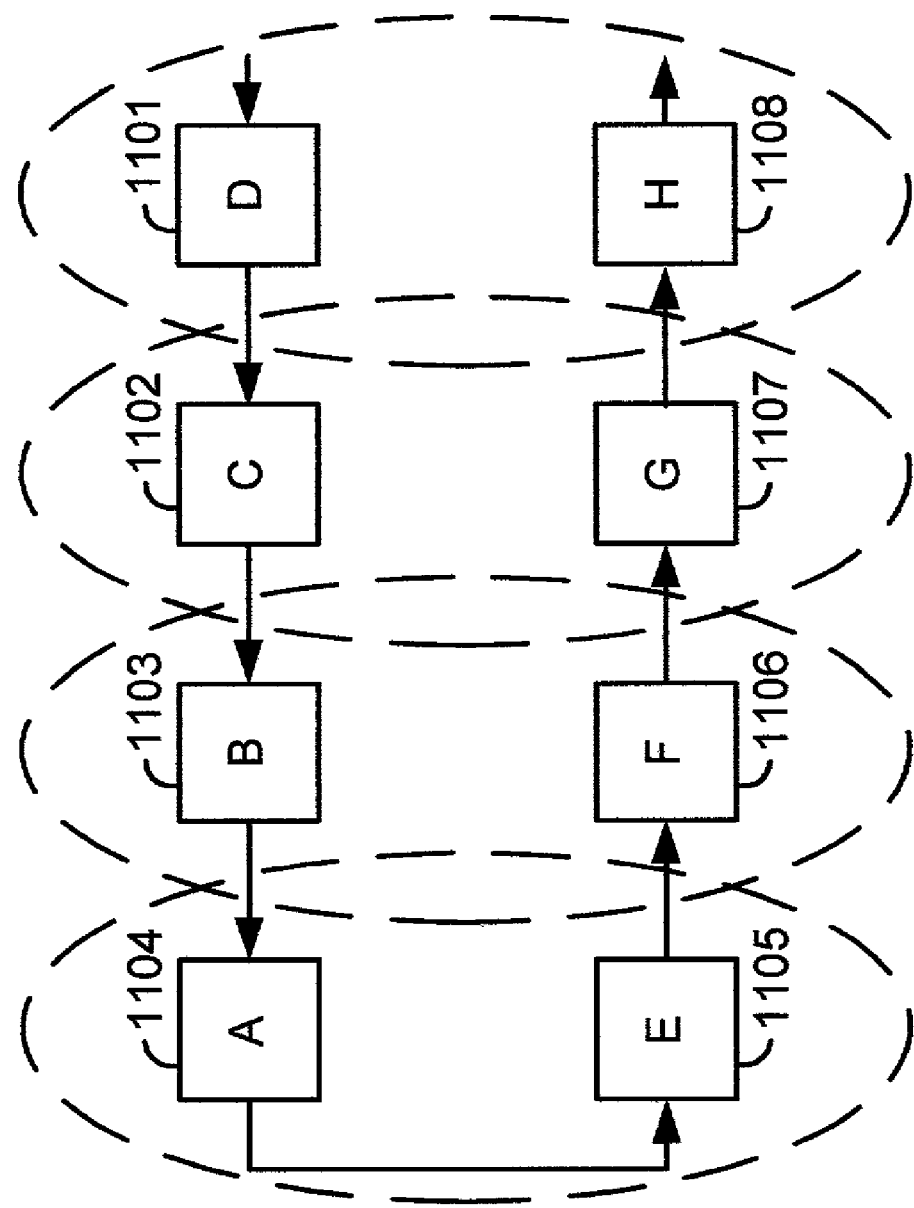
FIG. 11 illustrates, as an example, a single column, single shift mode of operation utilizing aspects of the present invention.

FIG. 11 is useful for illustrating an example of a single column, single shift mode of operation for a continuous incoming stream of information units. In this example, a double-back shifter includes a top row of storage units 1101~1104 initially containing sequence indicators A~D and a bottom row of storage units 1105~1108 initially containing sequence indicators E~H as shown in the figure. In order to perform a single shift operation instead of a double shift, at least one compare and reorder element or circuit in a third version of the reorder unit 200 employs the following first set of equations to provide equivalent results in this case as though compare and reorder, bottom row shift, and compare and reorder operations had been performed just prior to the shift.

$$A' = \max(A,E), \tag{1}$$

$$B' = \max(\max(B,F), \min(A,E)), \tag{2}$$

$$C' = \max(\max(C,G), \min(B,F)), \tag{3}$$

$$D' = \max(\max(D,H), \min(C,G)), \tag{4}$$

$$E' = \min(\min(A,E), \max(B,F)), \tag{5}$$

$$F' = \min(\min(B,F), \max(C,G)), \tag{6}$$

$$G' = \min(\min(C,G), \max(D,H)), \text{ and} \tag{7}$$

$$H' = \min(D,H), \tag{8}$$

where A'~D' are the reordered sequence indicators stored in the top row of storage units 1101~1104 just prior to the shift, and E'~H' are the reordered sequence indicators stored in the bottom row of storage units 1105~1108 just prior to the shift.

The first set of equations may then be modified as follows to form a second set of equations incorporating the final shift.

$$A'' = \max(\max(B,F), \min(A,E)), \tag{9}$$

$$B'' = \max(\max(C,G), \min(B,F)), \tag{10}$$

$$C'' = \max(\max(D,H), \min(C,G)), \tag{11}$$

$$D'' = \text{sequence indicator for new information unit shifted in}, \tag{12}$$

$$E'' = \max(A,E), \tag{13}$$

$$F'' = \min(\min(A,E), \max(B,F)), \tag{14}$$

$$G'' = \min(\min(B,F), \max(C,G)), \tag{15}$$

$$H'' = \min(\min(C,G), \max(D,H)), \text{ and} \tag{16}$$

Sequence indicator for information unit shifted out of bottom row = $\min(D,H)$, (17)

where A"~D" are the reordered sequence indicators stored in the top row of storage units 1101~1104 just after the shift, and E"~H" are the reordered sequence indicators stored in the bottom row of storage units 1105~1108 just after the shift.

Figure 12C:
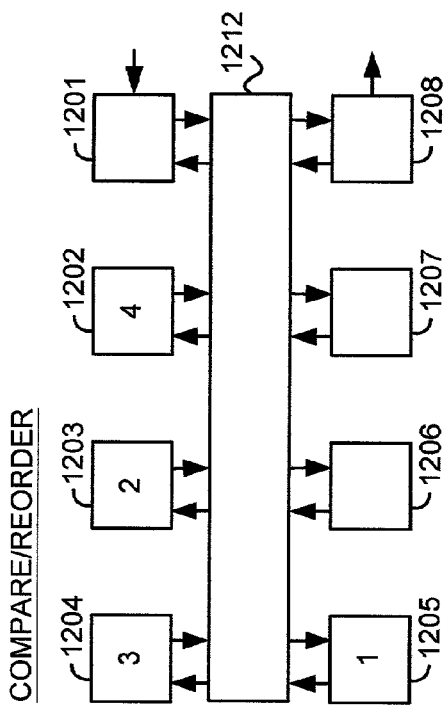
FIGS. 12A~12H illustrate a simplified example of the single column, single shift mode of operation on a limited stream of incoming information units, utilizing aspects of the present invention.
Figure 12D:
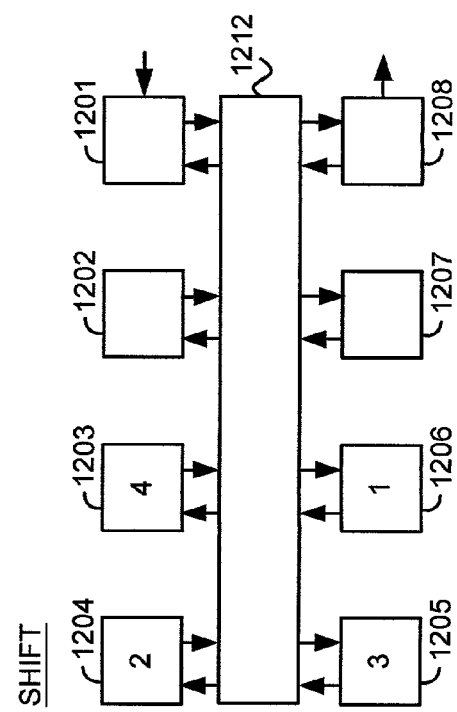
Figure 12A:
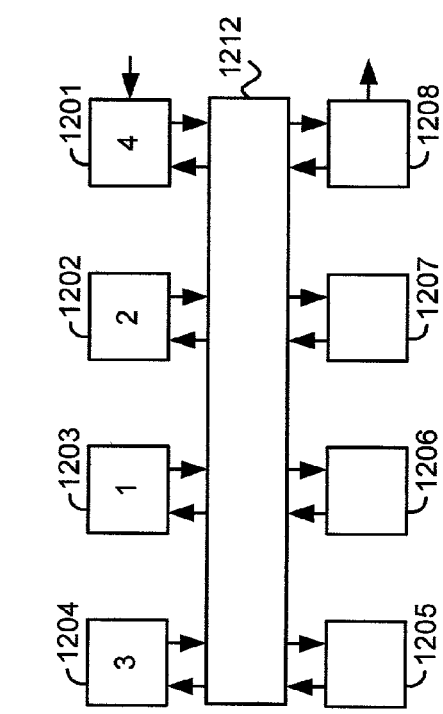
Figure 12B:
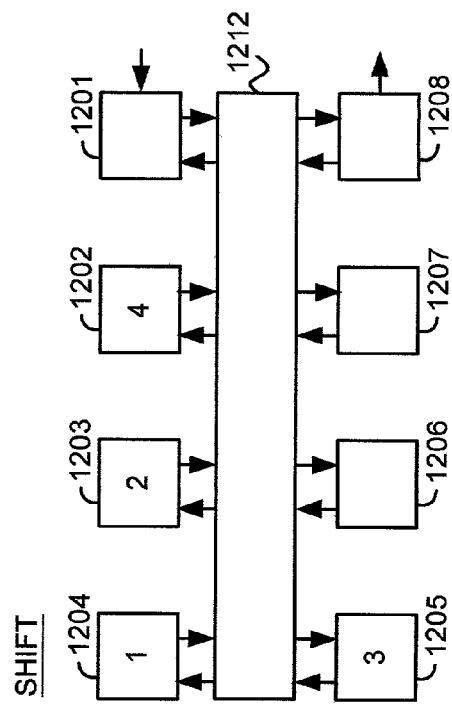

FIGS. 12A~12H illustrate, as a simplified example, the operation of a third version of the reorder cell unit 200, employing a single column, single shift mode of operation for a limited stream of incoming information units. In FIG. 12A, the first row of a double-back shifter including storage units 1201~1208 is shown storing sequence indicators that are out of sequence. No compare and reorder operations are performed at this point, because the bottom row of the double-back shifter is assumed to contain invalid entries. In FIG. 12B, a single column shift of the top and bottom rows has occurred. In FIG. 12C, the first set of equations (1)~(8) above have been employed to compare and reorder the sequence indicators in the double-back shifter, resulting in the sequence indicators in storage units 1204 and 1205 getting reordered according to the following equations:

$$A = \max(A, E) = \max(3, 1) = 3, \text{ and} \tag{18}$$

$$\begin{aligned} E &= \min(\min(A, E), \max(B, F)) \\ &= \min(\min(3, 1), \max(\text{invalid comparison})) \\ &= \min(\min(3, 1)) = 1. \end{aligned} \tag{19}$$

Figure 12G:
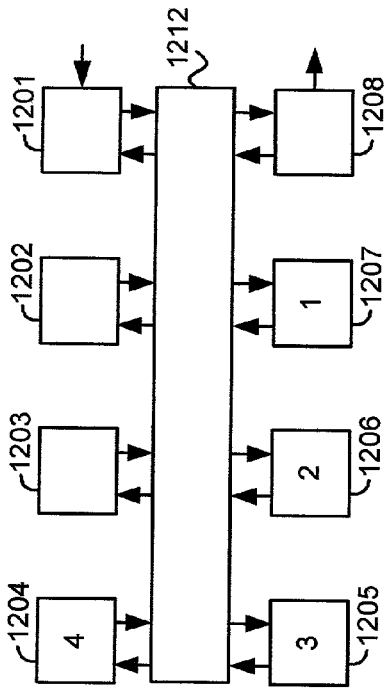

No other comparisons or changes were made in this simplified example, because the contents of storage units 1201 and 1206~1208 are assumed to be invalid entries. In FIG. 12D, a single column shift of the top and bottom rows has again occurred. In FIG. 12E, the first set of equations (1)~(8) above have again been employed to compare and reorder the sequence indicators in the double-back shifter, resulting in the sequence indicators in storage units 1204 and 1205 once again getting reordered according to the following equations:

$$A = \max(A, E) = \max(2, 3) = 3, \tag{20}$$

$$\begin{aligned} B &= \max(\max(B, F), \min(A, E)) \\ &= \max(\max(4, 1), \min(2, 3)) \\ &= \max(4, 2) = 4, \end{aligned} \tag{21}$$

$$\begin{aligned} E &= \min(\min(A, E), \max(B, F)) \\ &= \min(\min(2, 3), \max(4, 1)) \\ &= \min(2, 4) = 2, \text{ and} \end{aligned} \tag{22}$$

$$\begin{aligned} F &= \min(\min(B, F), \max(C, G)) \\ &= \min(\min(4, 1), \max(\text{invalid entry})) \\ &= \min(\min(4, 1)) = 1. \end{aligned} \tag{23}$$

No other comparisons or changes were made in this simplified example, because the contents of storage units 1201~1202 and 1207~1208 are assumed to be invalid entries. In FIG. 12F, a single column shift of the top and bottom rows has again occurred. In FIG. 12G, the first set of equations (1)~(8) above have again been employed, but this time, resulting in no reordering of sequence indicators.

Figure 12H:
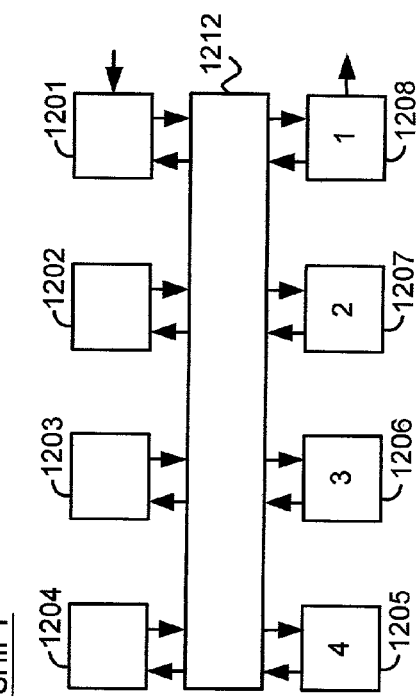
Figure 12E:
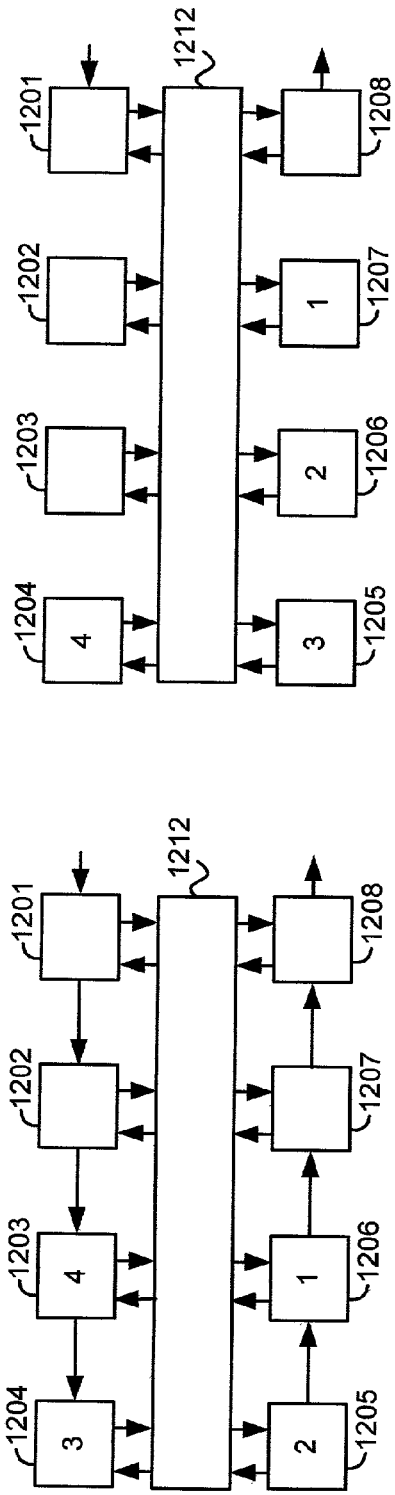
Figure 12F:
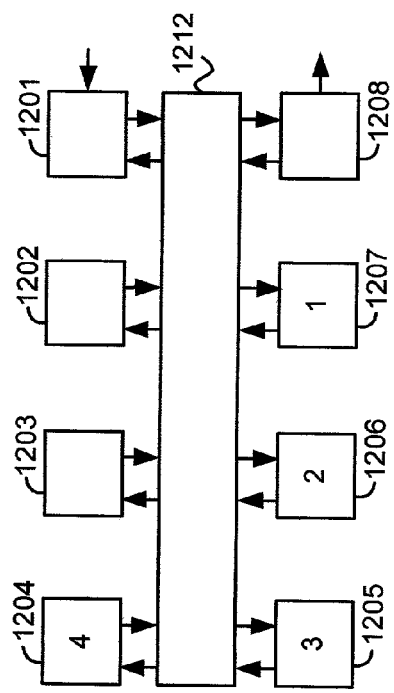

Finally, in FIG. 12H, a single column shift of the top and bottom rows has again occurred, and the sequence indicators are shown to now be in proper sequence.

Although a fourth version of the reorder unit 200 may be implemented with a multi-column, single shift mode of operation, such a version will not be described herein, because its implementation is readily determinable from the prior discussions. All versions, however, are fully contemplated to be within the scope of the present invention.

Figure 13:
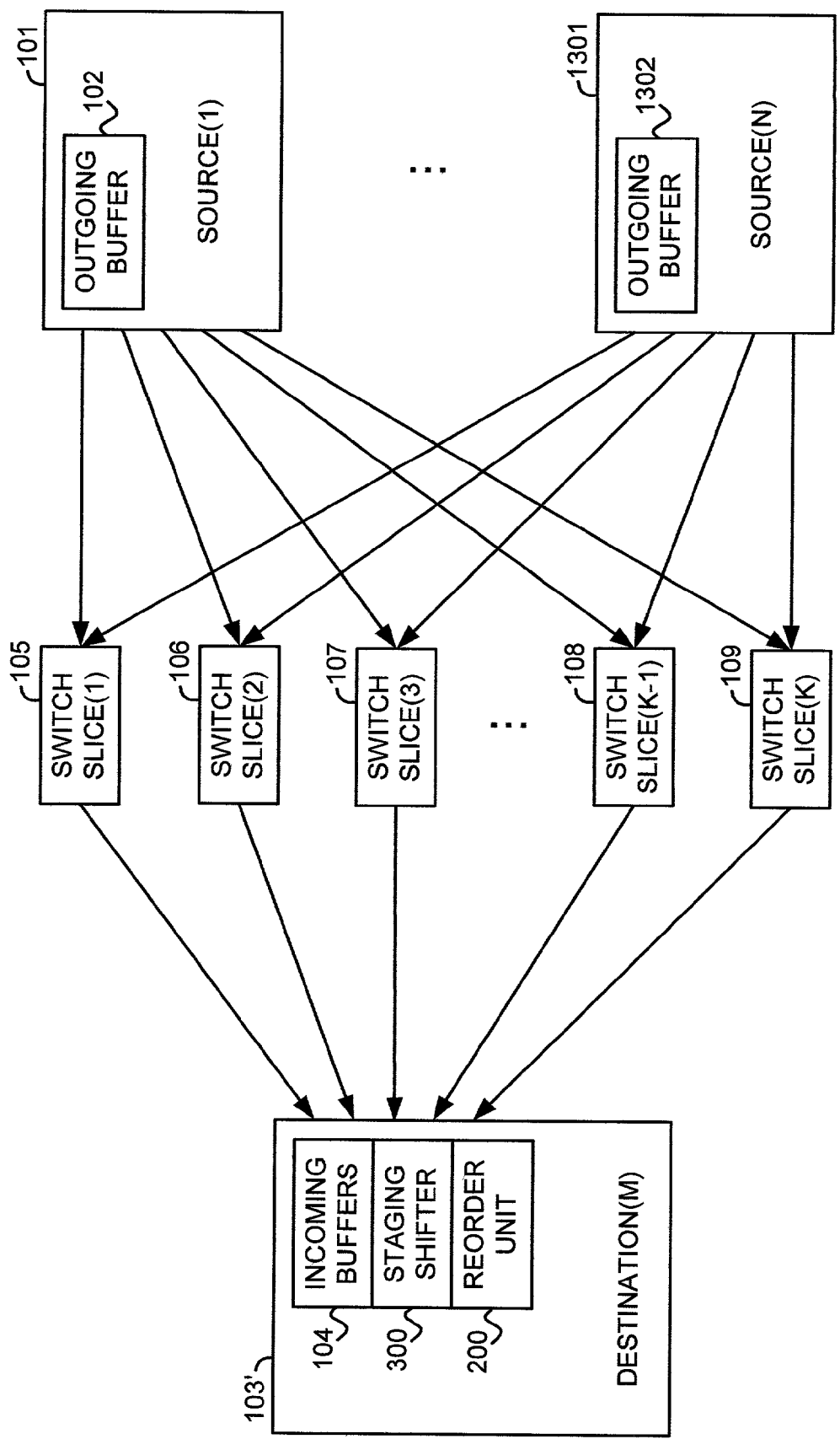
FIG. 13 illustrates, as another example, a block diagram of portions of a SONET network element including an apparatus utilizing aspects of the present invention.

FIG. 13 illustrates a block diagram of portions of a SONET network element including a plurality of sources including sources 101 and 1301 that transmit SONET payloads through a switch fabric including switch slices 105~109 to incoming buffers 104 of a destination 103'. A staging shifter 300 is included in the destination 103' to facilitate timely loading of information units from the incoming buffers 104 into the reorder unit 200. The cell reorder unit 200 accommodates such a multiple source system by reordering information units only if they are from the same source. Also, although the prior examples described operations on a finite number or limited stream of information units and thus assumed many invalid information units for simplification purposes, in practice, the cell reorder unit 200 may handle a continuous stream of information units entering and leaving it, with only occasional and sporadic invalid information units being received. In particular, the number/frequency of invalid information units being received may be occasional or sporadic in a densely packed continuous stream of information units, or the number/frequency of invalid information units being received may be large in a sparsely packed and continuous stream of information units.

Figure 14:
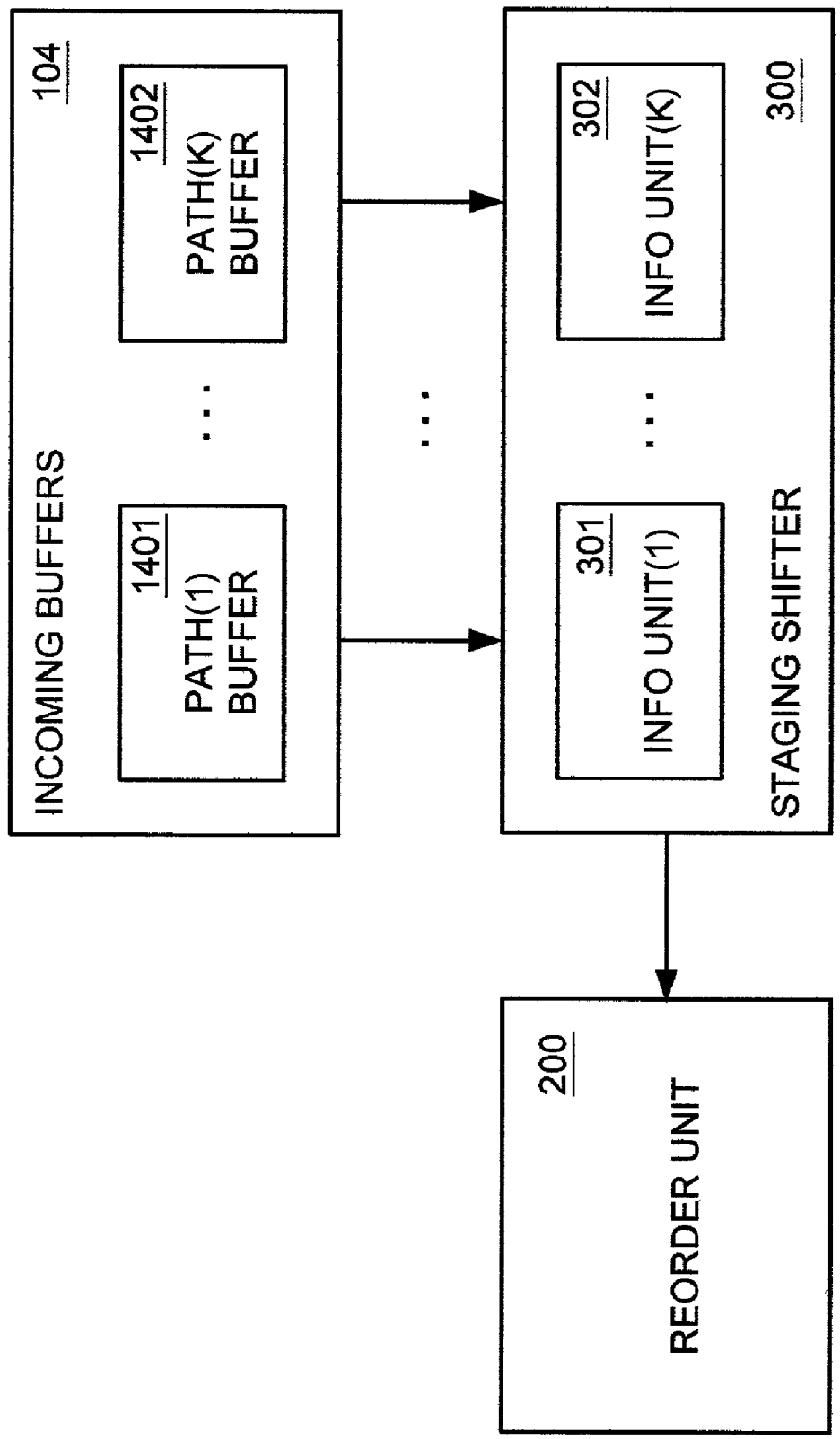
FIG. 14 illustrates, as an example, a block diagram including further detail on the relationship of the incoming buffers, the staging shifter and the reorder unit, utilizing aspects of the present invention.

FIG. 14 illustrates, as an example, a block diagram including further detail on the relationship of the incoming buffers 104, the staging shifter 300 and the reorder unit 200. The incoming buffers 104 include a plurality of path buffers, one for each path or switch slice in the SONET network element. Each path buffer receives incoming payloads from its assigned switch slice (e.g., path(1) buffer 1401 from switch slice(1) 105, and path(K) buffer 1402 from switch slice(K) 109). The staging shifter 300 includes a plurality of storage units, one for each path buffer. Each storage unit stores an information unit from its respective path buffer (e.g., information unit(1) stored in storage unit 301 from path(1) buffer 1401, and information unit(K) stored in storage unit 302 from path(K) buffer 1402). Information units for available SONET payloads or cells are preferably read in parallel periodically at the cell transfer rate from the path buffers into their respective storage units of the staging shifter 300. The information units are then shifted serially into the reorder unit 200, n-columns at a time upon each shift of the top row, wherein the integer "n" depends upon the mode of operation of the reorder unit 200. The length of the double-back shifter is determined in this case by the number of paths in the SONET network element that may send information units to the destination, and the skew or difference of best case and worst case transit times for those information units through the switch slices. Also, since the maximum size of the sequence indicators is finite, the sequence indicators may wrap-around for long streams of SONET payloads. The compare and reorder logic in the cell reorder unit 200 detects such a wrap-around occurrence by, for example, inspection of the two most significant bits of the sequence indicator changing from "11" to "00".

Figure 15:
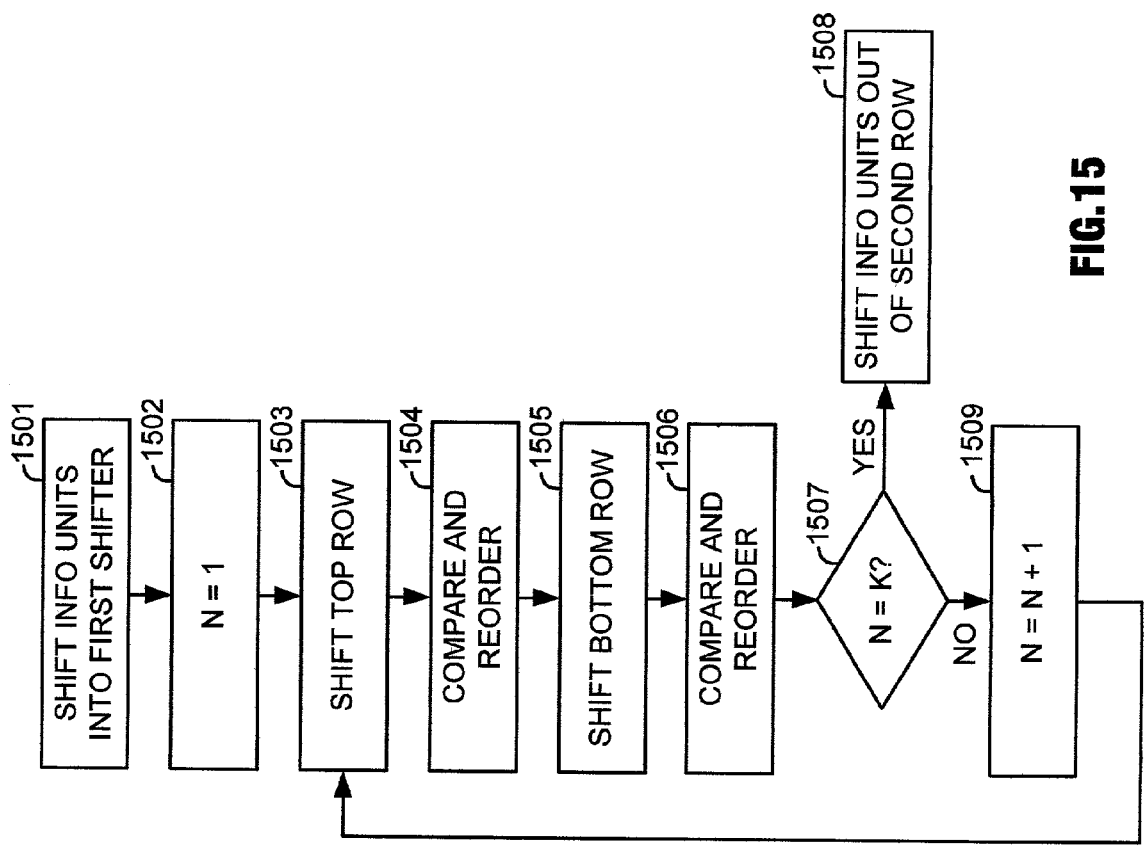
FIG. 15 illustrates, as an example, a flow diagram of a method for reordering sequence indicated information units into proper sequence employing a single column, double shift mode of operation on a limited stream of incoming information units, utilizing aspects of the present invention.

FIG. 15 illustrates, as an example, a flow diagram of a method for reordering sequence indicated information units into proper sequence for a limited stream or finite number of incoming information units. In 1501, the method includes storing information units in a first shifter. As an example, this may involve receiving SONET payloads transmitted through a distributed switch fabric from one or more sources, and storing information units associated with the SONET payloads in the first shifter. For a finite stream, as in this example, the information units may be stored in parallel into the first shifter, whereas in a continuous stream, they would generally be shifted in one or more at a time. In 1502, the method includes setting a counter N to integer 1. In 1503, the method includes shifting the information units in the first shifter by one position, and storing a shifted out information unit in a second shifter. In 1504, the method includes comparing information units stored in corresponding positions of the first and second shifters, and reordering the information units between the corresponding positions according to sequence information included in the information units. In a multiple source system, the reordering is only performed on information units between the corresponding positions if the information units are from a same source and valid. In 1505, the method includes shifting the information units in the second shifter by one position. In 1506, the method includes comparing information units stored in corresponding positions of the first and second shifters, and reordering the information units between the corresponding positions according to sequence information included in the information units. Again, in a multiple source system, the reordering is only performed on information units between the corresponding positions if the information units are from a same source and valid. In 1507, the method includes checking the counter N to determine whether it has incremented to a value K, which is generally equal to the number of columns in the top or bottom row of the double-back shifter. The minimum number of columns in this case is determined by the necessary number of iterations of 1503~1506 to shift the information units into and process through the second shifter so that they exit in proper sequence. If the method determines that the counter N has incremented to the value K, then the information units are ready to exit the second shifter in proper sequence. Therefore, in this case, in 1508, the method includes shifting the information units out of the second shifter for further processing within the destination. For a finite stream, as in this example, the information units may be shifted out in parallel from the second shifter, whereas in a continuous stream, they would generally be shifted out one or more at a time. On the other hand, if the method determines that the counter N has not incremented to the value K, then in 1509, it increments the counter N by 1, and jumps back to 1503 to continue repeating 1503~1509, so as to shift the information units into and process through the second shifter so that they exit in proper sequence according to the sequence information included in the information units.

Figure 16:
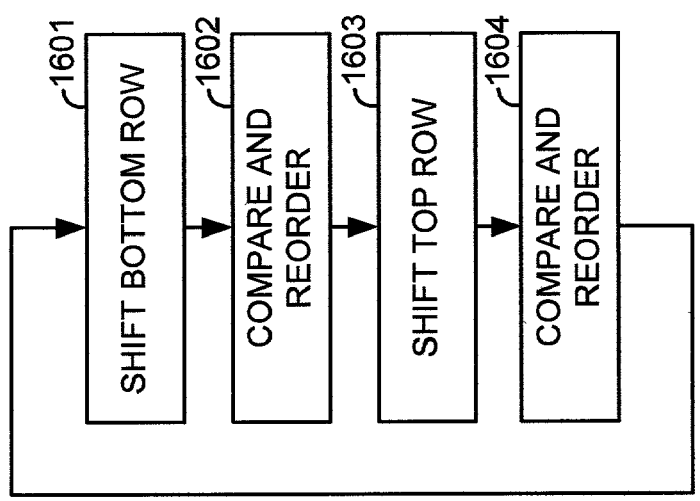
FIG. 16 illustrates, as an example, a flow diagram of a method for reordering sequence indicated information units into proper sequence employing a single column, double shift mode of operation on a continuous stream of incoming information units, utilizing aspects of the present invention.

In a system employing a continuous stream of input and output information units, the counter N may be deleted. FIG. 16 illustrates, as an example, a flow diagram of a method for reordering sequence indicated information units into proper sequence employing a single column, double shift mode of operation on a continuous stream of incoming information units. In 1601, the bottom row of the double-back shifter is shifted. Shifting the bottom row first is preferable in this case, because it makes the first storage unit on the bottom row available for an information unit that will be subsequently shifted into it when the top row is shifted, wherein the number of columns shifted depends upon the mode of operation of the double-back shifter. In 1602, at least one circuit in the reorder unit 200 compares sequence indicators in corresponding sets of storage units in the double-back shifter, and reorders information units in associated storage units in the double-back shifter as necessary, wherein the corresponding sets of storage units and associated storage units depend upon the mode of operation of the double-back shifter. In 1603, the top row of the double-back shifter is shifted, wherein the number of columns shifted depends upon the mode of operation of the double-back shifter. In 1604, at least one circuit in the reorder unit 200 again compares sequence indicators in corresponding sets of storage units in the double-back shifter, and reorders information units in associated storage units in the double-back shifter as necessary. The method then repetitively performs 1601~1604 so that all information units are in proper sequence by the time they are shifted out of the double-back shifter.

Figure 17:
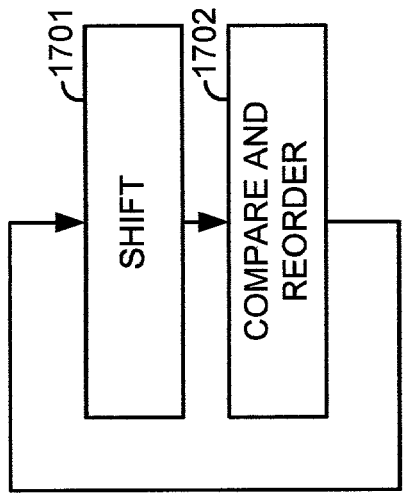
FIG. 17 illustrates, as an example, a flow diagram of a method for reordering sequence indicated information units into proper sequence employing a single column, single shift mode of operation on a continuous stream of incoming information units, utilizing aspects of the present invention.
Figure 18:
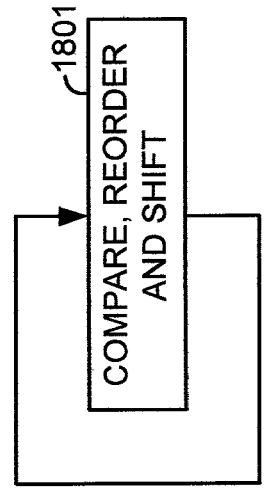
FIG. 18 illustrates, as an example, a flow diagram of a method for reordering sequence indicated information units into proper sequence employing a combined single column, single shift mode of operation on a continuous stream of incoming information units, utilizing aspects of the present invention.

FIG. 17 illustrates, as an example, a flow diagram of a method for reordering sequence indicated information units into proper sequence employing a single column, single shift mode of operation on a continuous stream of incoming information units. In this method, only a single shift is performed so that both top and bottom rows are shifted at the same time. FIG. 18 illustrates, as an example, a flow diagram of a method for reordering sequence indicated information units into proper sequence employing a combined single column, single shift mode of operation on a continuous stream of incoming information units. The methods depicted in FIGS. 17 and 18 are described in reference to FIGS. 11 and 12, so they are not repeated here in order to avoid unnecessary redundancy.

Although the various aspects of the present invention have been described with respect to a preferred embodiment, it will be understood that the invention is entitled to full protection within the full scope of the appended claims.

We claim:

1. An apparatus for reordering sequence indicated information units, comprising:
   (a) a double-back shifter having plural storage devices, the shifter being for receiving and simultaneously storing a plurality of sequence indicated information units in corresponding ones of its storage devices, where the received units can be initially organized logically and upon receipt in an initial sequential order other than a proper order defined by respective sequence indicators received with and included in the received information units; and
   (b) at least a first test-and-reshuffle circuit coupled to first and second unit storage devices of said double-back shifter for testing the respective sequence indicators of valid information units, if any, stored in the first and second storage devices for proper relative order, and for reshuffling at least the relative logical order of the tested units within the double-back shifter if said testing shows the tested information units to be out of proper relative sequential order, said testing and reshuffling being repeatable for further information units that next shift into at least one of the first and second unit storage devices so that after being reshuffled, received but out of order information units can emerge in proper relative sequence when finally shifted out of said double-back shifter.

2. The apparatus according to claim 1, wherein the unit storage devices of said double-back shifter are interconnected to define:
   (a.1) a first plurality of storage devices configured to shift information units contained therein from one to another in a first direction; and
   (a.2) a second plurality of storage devices configured to shift information units contained therein from one to another in a second direction opposite to said first direction, said second plurality of storage devices being coupled to said first plurality of storage devices such that a last one of said first plurality of storage devices shifts its contents into a first one of said second plurality of storage devices.

3. The apparatus according to claim 1, wherein
   (b.1) said at least first test-and-reshuffle circuit repetitively compares sequence indicators included in sequence indicated information units stored in at least said first and second storage devices of said double-back shifter, and in response, selectively reorders sequence indicated information units stored in associated ones of the storage devices of the double-back shifter according to said comparisons.

4. The apparatus according to claim 3, wherein
   (a.1a) one or more storage devices provided in a first shifting order of said first plurality of serially coupled storage devices are operatively paired by the first test-and-reshuffle circuit and for comparison and/or cross-shuffling of contents with one or more storage devices provided in a reverse shifting order of said second plurality of serially coupled storage devices.

5. The apparatus according to claim 4, wherein
   said at least first test-and-reshuffle circuit is configured to perform a single column, double shift mode of operation wherein information units that are to be cross-tested over one testing column for proper relative order to one another when in that testing column are shifted at different times through said first and second pluralities of serially coupled storage devices and into that one testing column.

6. The apparatus according to claim 4, wherein said at least first test-and-reshuffle circuit is configured to perform a multicolumn mode of operation wherein at least one information unit that is to be cross-tested for proper relative order to at least one other unit, resides in a different testing column than that of the other unit at the time of cross-testing.

7. The apparatus according to claim 4, wherein said at least first test-and-reshuffle circuit is configured to perform a single shift mode of operation wherein information units that are to be cross-tested over one testing column for proper relative order to one another when in that testing column are shifted at essentially same times into that one testing column.

8. The apparatus according to claim 1, wherein
   said received information units include corresponding sequence indicators for corresponding SONET payloads transmitted from at least one source module and through a switch fabric to a destination module, where the destination module includes said double-back shifter.

9. The apparatus according to claim 8, wherein
   said at least one source module, said destination module and said switch fabric are distributed in a multi-shelf system.

10. The apparatus according to claim 8, wherein
   said received information units include corresponding sequence indicators for corresponding SONET payloads transmitted from at least two different source modules and said sequence indicated information units include source-identifying indicators identifying the source modules of their respective SONET payloads, and said at least first test-and-reshuffle circuit only cross-tests for purpose of possible reordering, the sequence indicators of information units having source-identifying indicators indicating a same source.

11. The apparatus according to claim 8, wherein said switch fabric includes a plurality of switch slices.

12. The apparatus according to claim 11, wherein said double-back shifter includes a first number of said plural storage devices, which first number is greater than a second number of switch slices that can be transmitting to the destination module at substantially the same time, the difference between the first and second numbers being a function of a skew between best and worst case transit times for sequence indicated information units transmitted to said destination at substantially the same time by way of said second number of switch slices.

13. The apparatus according to claim 11, further comprising:
   a plurality of path buffers included in said destination module and individually configured to receive SONET payloads transmitted from a corresponding one of said plurality of switch slices; and
   a staging shifter including a plurality of staging storage units individually corresponding to a respective one of said plurality of path buffers so that sequence indicated information units of received SONET payloads can be periodically loaded into said plurality of staging storage units at a first cell transfer rate and shifted into said double-back shifter at a different rate before a next loading of received SONET payloads begins.

14. The apparatus according to claim 13, wherein said cell transfer rate is equivalent to a rate that a SONET payload is transmitted from a source module in said switch fabric to said destination module.

15. The apparatus according to claim 13, wherein said sequence indicated information units individually each further includes a payload location pointer pointing to a location where associated payload data is stored.

16. The apparatus according to claim 13, wherein said sequence indicated information units individually further each includes a valid entry indicator, and said at least first test-and-reshuffle circuit only compares for purpose of possible reordering, sequence indicated information units having valid entry indicators indicating valid entries.

17. A method for reordering sequence indicated information units into proper sequence, comprising:
   (a) storing sequence indicated information units in a double-back shifter;
   (b) while the information units remain within the double-back shifter, repetitively comparing, reordering and shifting the sequence indicated information units within the double-back shifter so as to cause the information units to be in proper indicated sequence when shifted out of said double-back shifter.

18. The method according to claim 17, wherein:
   (a.1) said double-back shifter includes an upper row having plural storage positions and a lower row having plural storage positions; and
   said repetitively comparing, reordering and shifting comprises:
   (b.1) shifting data through the upper and lower rows of said double-back shifter so as to shift at least one new sequence indicated information unit into at least one vacated position in said upper row, shift at least one sequence indicated information unit from said upper row to said lower row, and shift at least one sequence indicated information unit out of said lower row that is in proper sequence relative to all other earlier-held and currently stored sequence indicated information units in said double-back shifter that originated from a same data source;
   (b.2) comparing sequence indicators of said sequence indicated information units residing in corresponding positions of said upper and said lower rows of said double-back shifter, and reordering sequence indicated information units in associated positions of said upper and said lower rows according to said comparisons; and
   (b.3) repeating said steps (b.1) and (b.2) so as to process an incoming stream of sequence indicated information units arriving from one or more data sources.

19. The method according to claim 18, wherein
   (b.1a) said shifting comprises shifting each of said upper and lower rows of said double-back shifter one position at a time.

20. The method according to claim 18, wherein
   (b.1) said shifting comprises shifting each of said upper and lower rows of said double-back shifter more than one position at a time.

21. The method according to claim 17, wherein said repetitively comparing, reordering and shifting comprises:
   (b.1) shifting sequence indicated information units in a lower row of said double-back shifter, and shifting at least one sequence indicated information unit out of said lower row in proper sequence relative to all other earlier-held and currently stored sequence indicated information units in said double-back shifter that originated from a same data source;
   (b.2) comparing sequence indicated information units stored in one or more positions of the upper row of said double-back shifter against sequence indicated information units stored in one or more positions of the lower row of said double-back shifter, and reordering said compared ones of the sequence indicated information units in said double-back shifter according to sequence indicators included in said compared sequence indicated information units;
   (b.3) shifting said sequence indicated information units in said upper row of said double-back shifter, shifting in at least one new sequence indicated information unit into at least one vacated position in said upper row, and shifting at least one sequence indicated information unit from said upper row to said lower row; and
   (b.4) repeating said steps (b.1) to (b.3) to thereby process an incoming stream of sequence indicated information units.

22. The method according to claim 21, wherein said shiftings of steps (b.1) and (b.3) respectively comprise shifting said upper and lower rows of said double-back shifter one position at a time.

23. The method according to claim 21, wherein said shifting of steps (b.1) and (b.3) respectively comprise shifting said upper and lower rows of said double-back shifter more than one position at a time.

24. The method according to claim 17, wherein the doubleback shifter includes an upper row for receiving new data and a lower row for storing older data, the method further comprising:
   receiving payloads transmitted through a distributed switch fabric-from at least one of plural sources; and
   shifting at least one new sequence indicated information unit of said received payloads into said double-back shifter upon each shift of said upper row of said double-back shifter.

25. The method according to claim 24, wherein said repetitively comparing, reordering and shifting comprises comparing and reordering sequence indicated information units having source indicators indicating a same source.

26. The method according to claim 24, wherein said repetitively comparing, reordering and shifting
comprises comparing and reordering sequence indicated information units having valid entry indicators indicating valid entries.

27. A data reordering mechanism comprising:
(a) a plurality of data storage units each for storing at least a corresponding, proper sequence indicator of a correspondingly received one of plural data payloads that were received in a given time period, but not necessarily received during the given time period in an order defined by their respective, proper sequence indicators, the plurality of data storage units defining part of a shifter through which the stored sequence indicators can be serially shifted; and
(b) a plurality of test-and-reshuffle circuits each coupled at least to a corresponding two different data storage units within the shifter and each operative to cross-test valid sequence indicators respectively stored in the corresponding at least two data storage units against one another, said cross-testing including testing the relative logical sequence indicated by the respectively stored sequence indicators against the relative physical storage sequence that the tested sequence indicators have within the shifter to thereby determine if the relative physical storage sequence properly comports with the indicated, relative logical sequence of the cross-tested valid sequence indicators,
(b.1) where upon determining that an improper relative physical storage sequence is present between two or more of its correspondingly cross-tested sequence indicators, each test-and-reshuffle circuit reshuffles the relative physical storage sequence within the shifter of its tested and improperly located sequence indicators, and reshuffles the relative physical storage sequence within the shifter of payload data and/or other payload related data stored in association with the improperly located sequence indicators so as to bring the relative physical storage sequence of the improperly located sequence indicators and their associated payload data or payload related data into better compliance with the relative logical sequence indicated by the respectively stored and cross-tested sequence indicators.

28. The data reordering mechanism of claim 27 wherein:
(b.1a) at least one of said test-and-reshuffle circuits reshuffles the relative physical storage sequence within the shifter of at least two of its tested and improperly located sequence indicators by cross-swapping the locations of storage within the shifter of the at least two improperly located sequence indicators.

29. The data reordering mechanism of claim 27 wherein:
(b.1a) at least two of said test-and-reshuffle circuits concurrently cross-test valid sequence indicators respectively stored in the corresponding data storage units of the corresponding at least two test-and-reshuffle circuits.

30. The data reordering mechanism of claim 29 wherein the number of test-and-reshuffle circuits that concurrently cross-test valid sequence indicators is greater than four.

31. The data reordering mechanism of claim 27 wherein:
(a.1) said shifter is divisible into at least first and second shifting rows, the first shifting row comprising a corresponding first set of said data storage units, the second shifting row comprising a corresponding second and mutually exclusive set of said data storage units, where for nonshuffled serial shifting of data about the shifter, the first shifting row receives respective ones of shifted sequence indicators before the second shifting row has the same respective sequence indicators shifted into it; and
(b.1a) at least two of said test-and-reshuffle circuits each cross-tests valid sequence indicators respectively stored in the first and second shifting rows.

32. The data reordering mechanism of claim 31 wherein the number of test-and-reshuffle circuits that each cross-test a valid sequence indicator stored in the first shifting row against one or more valid sequence indicators stored in the second shifting row is greater than four.

33. The data reordering mechanism of claim 31 wherein:
(a.2) data can be shifted by the second shifting row independently of whether data is being concurrently shifted by the first shifting row.

34. A data reordering method comprising:
(a) storing in a plurality of data storage units, at least a plurality of corresponding, proper sequence indicators of correspondingly received ones of plural data payloads that were received in a given time period, but not necessarily received during the given time period in an order defined by their respective, proper sequence indicators, the plurality of data storage units defining part of a shifter through which the stored sequence indicators can be serially shifted; and
(b) using a plurality of test-and-reshuffle circuits, each coupled to a corresponding at least two different data storage units within the shifter, for cross-testing valid sequence indicators respectively stored in the corresponding at least two data storage units against one another, said cross-testing including testing the relative logical sequence indicated by the respectively stored sequence indicators against the relative physical storage sequence that the tested sequence indicators have within the shifter to determine if the relative physical storage sequence properly comports with the indicated, relative logical sequence of the cross-tested valid sequence indicators,
(b.1) upon determining that an improper relative physical storage sequence is present between two or more of its correspondingly cross-tested sequence indicators, reshuffling the relative physical storage sequence within the shifter of the tested and improperly located sequence indicators so as to bring the relative physical storage sequence of the improperly located sequence indicators into better compliance with the relative logical sequence indicated by the respectively stored sequence indicators.

35. The data reordering method of claim 34 and further comprising:
(b.2) upon determining that an improper relative physical storage sequence is present between two or more of its correspondingly cross-tested sequence indicators, reshuffling the relative physical storage sequence within the shifter of payload data and/or other payload related data stored in association with the improperly located sequence indicators so as to bring the relative physical storage sequence of the improperly located sequence indicators and their associated payload data or payload related data into better compliance with the relative logical sequence indicated by the respectively stored sequence indicators.

36. The data reordering method of claim 34 wherein:

(b.2) during said using, two or more of said plurality of test-and-reshuffle circuits concurrently cross-test their respective and valid sequence indicators.

37. The data reordering method of claim 36 wherein:

(b.3) during said using, two or more of said plurality of test-and-reshuffle circuits concurrently reshuffle their respective and valid sequence indicators.

38. The data reordering method of claim 34 wherein:

(b.2) said using includes determining if valid sequence indicators respectively stored in the corresponding at least two data storage units are from a same source of sequential data and of not reshuffling such sequence indicators if not from the same source.

39. The data reordering method of claim 34 wherein:

(b.2) said using includes shifting the plurality of corresponding, sequence indicators through the shifter so that for a given received burst of sequence indicators, each sequence indicator will have been cross-tested against all the others of the sequence indicators in the received burst.

40. The data reordering method of claim 34 wherein said shifter has at least first and second independent shift rows, the first being serially coupled to the second, and (b.2) said using includes shifting part of the plurality of corresponding, sequence indicators through the first shift row while not shifting sequence indicators stored in the second shift row.

\* \* \* \* \*